United States Patent [19]

Kawano et al.

[11] Patent Number: 5,129,475
[45] Date of Patent: Jul. 14, 1992

[54] CRUISE CONTROL DEVICE FOR MOTOR VEHICLES

[75] Inventors: Atsuhiro Kawano, Obu; Yoshiaki Sano, Okazaki; Hiroshi Umeda, Okazaki; Takeshi Nishimura, Okazaki; Yasunobu Miyata, Komaki; Keiji Inagaki, Okazaki, all of Japan

[73] Assignee: Mitsubishi Jidosha Kogyo Kabushiki Kaisha, Tokyo, Japan

[21] Appl. No.: 701,510

[22] Filed: May 16, 1991

Related U.S. Application Data

[62] Division of Ser. No. 405,540, Sep. 11, 1989, Pat. No. 5,036,936.

Foreign Application Priority Data

Sep. 20, 1988 [JP] Japan .................. 63-237099
Sep. 20, 1988 [JP] Japan .................. 63-237100
Oct. 14, 1988 [JP] Japan .................. 63-257331

[51] Int. Cl.$^5$ .......................................... B60K 31/04
[52] U.S. Cl. ........................................ 180/179; 74/866; 364/424.1; 364/426.04
[58] Field of Search .............. 180/174, 175, 176, 177, 180/178, 179; 364/424.1, 426.04, 431.07, 424.01; 123/350, 361, 399; 74/859, 860, 866

[56] References Cited

U.S. PATENT DOCUMENTS

| | | | |
|---|---|---|---|
| 4,027,554 | 6/1977 | Ito et al. | 74/866 |
| 4,439,833 | 3/1984 | Yamaguchi et al. | 180/179 X |
| 4,516,652 | 5/1985 | Tanigawa et al. | 74/866 X |
| 4,698,762 | 10/1987 | Moriya et al. | 364/426.04 X |
| 4,803,637 | 2/1989 | Tada et al. | 180/179 X |
| 4,829,437 | 5/1989 | Suzuki et al. | 364/426.04 |
| 4,835,696 | 5/1989 | Suzuki et al. | 180/179 |
| 4,845,622 | 7/1989 | Suzuki et al. | 364/426.04 |
| 4,879,655 | 11/1989 | Mori | 180/179 X |
| 4,905,786 | 3/1990 | Miyake et al. | 180/179 |
| 4,914,595 | 4/1990 | Suzuki et al. | 364/426.04 |
| 4,926,334 | 5/1990 | Suzuki et al. | 180/179 X |
| 4,943,923 | 7/1990 | Naito | 180/179 X |
| 4,967,358 | 10/1990 | Etoh | 180/179 |

FOREIGN PATENT DOCUMENTS

| | | | |
|---|---|---|---|
| 2306101 | 10/1976 | France. | |
| 0024621 | 2/1986 | Japan | 180/178 |
| 0232927 | 10/1986 | Japan | 180/178 |
| 0299436 | 12/1987 | Japan | 180/178 |

Primary Examiner—Andres Kashnikow
Assistant Examiner—Brian L. Johnson
Attorney, Agent, or Firm—Frishauf, Holtz, Goodman & Woodward

[57] ABSTRACT

A cruise control device is provided with a vehicle speed sensor for detecting the actual vehicle speed, and an electronic controller for controlling the opening of the throttle valve based on the detected vehicle speed, to bring the vehicle speed close to a target vehicle speed. The electronic controller serves to obtain a vehicle speed deviation between the target vehicle speed set by a set switch and the actual vehicle speed, select one of a P control mode, a P/D control mode and a fuzzy control mode corresponding to the magnitude of the vehicle speed deviation, and control the opening of the throttle valve. In addition to these functions, the electronic controller may additionally have the function of estimating a change in the vehicle speed provided that the current opening of the throttle valve is maintained, to obtain a correction value for the vehicle speed so that a corrected vehicle speed corrected by the correction value is used to control the opening of the throttle valve. Further, in the case of a vehicle provided with an automatic transmission, a shift diagram applied to a cruise control mode may be prepared in addition to the shift diagram for the automatic transmission itself, so that the electronic controller may have the function of effecting a shifting of the gear ratios of the automatic transmission.

3 Claims, 28 Drawing Sheets

TARGET THROTTLE OPENING

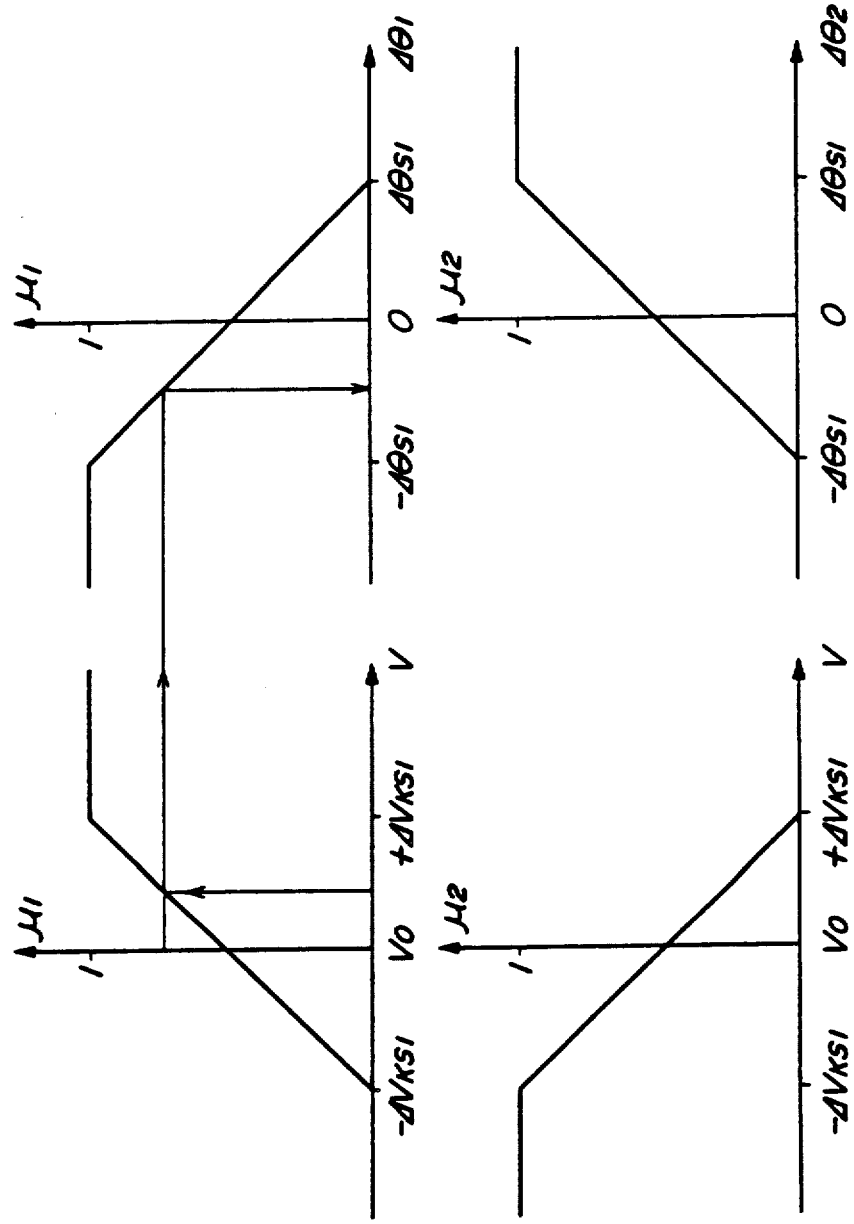

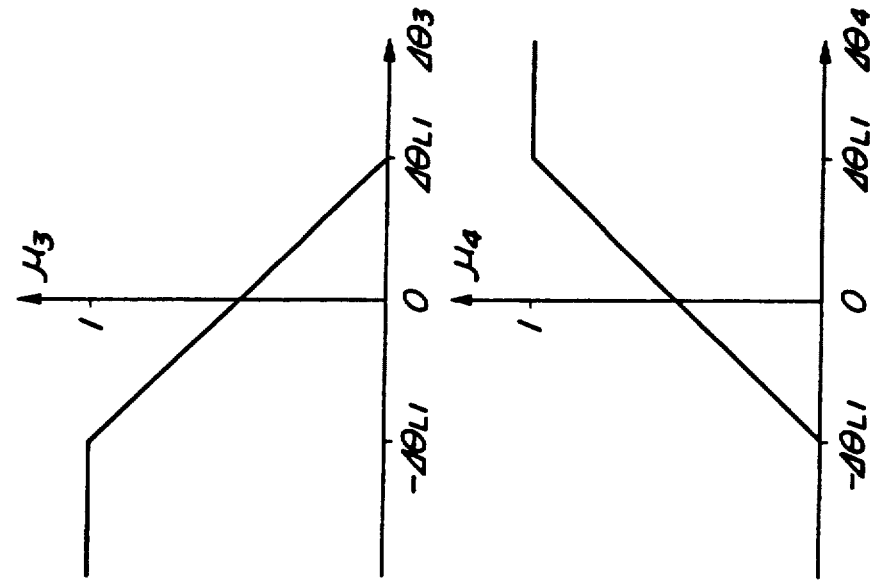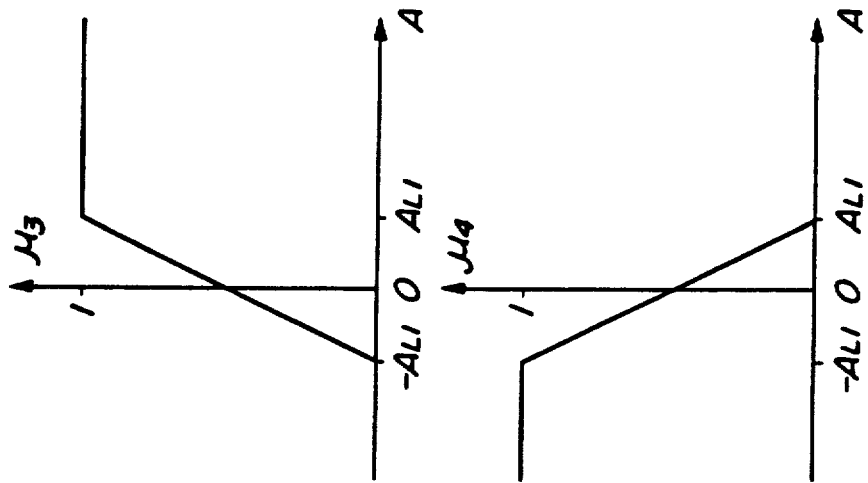

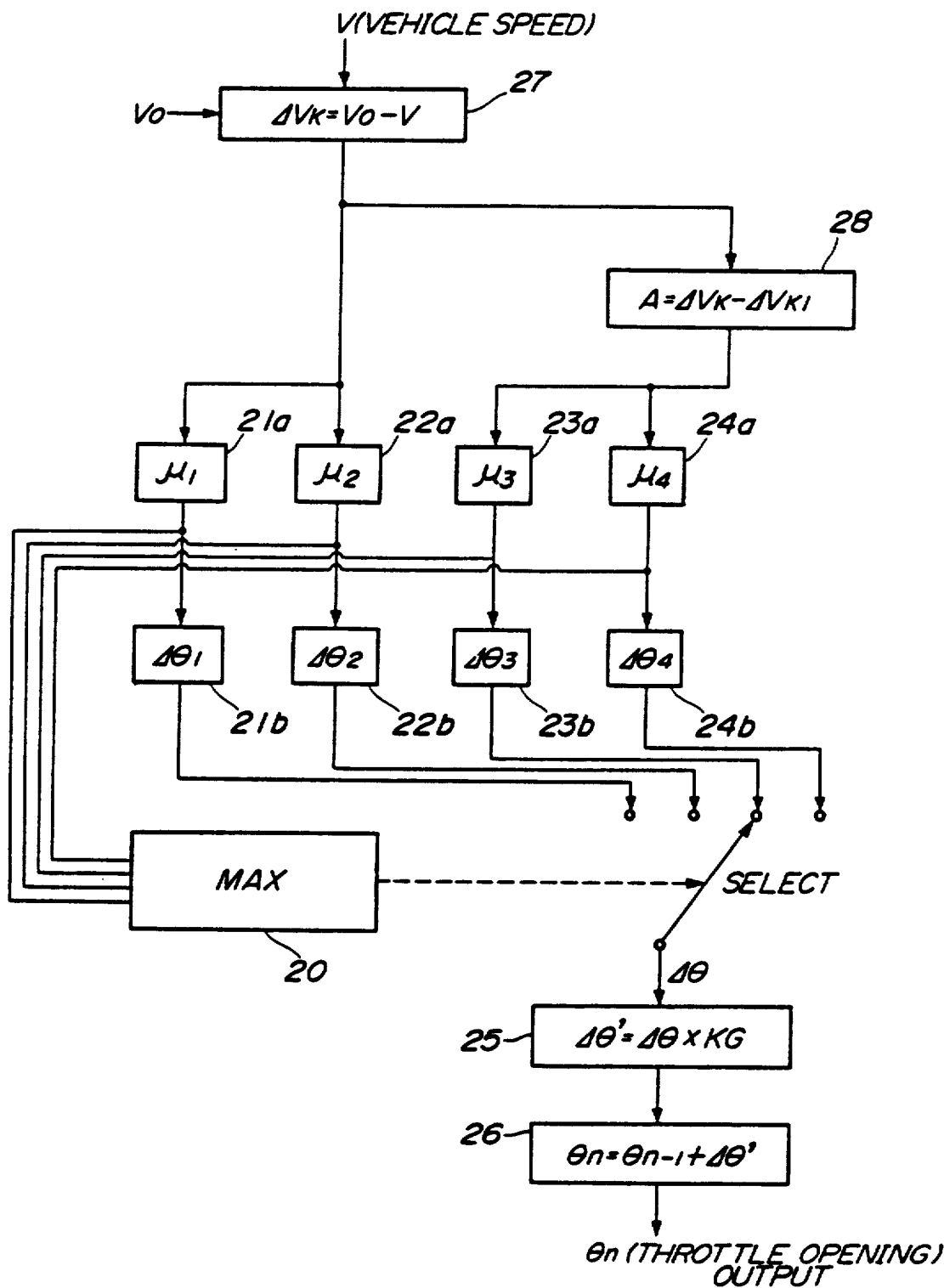

CRUISE CONTROL DEVICE FOR MOTOR VEHICLES

This is a division of application Ser. No. 07/405,540 file Sep. 11, 1989. now U.S. Pat. No. 5,036,936.

BACKGROUND OF THE INVENTION

The present invention relates to a cruise control device capable of automatically changing the speed of a motor vehicle and maintaining it at a desired speed.

Among motor vehicles, those provided with a cruise control device are known. The cruise control device has the function of maintaining the speed of a motor vehicle, i.e., the vehicle speed, at a setting speed to provide automatic cruising, whereby the burden of operation on a driver can be reduced when the driver intends to run the vehicle at a constant speed. Namely, while the cruise control device is operating, the driver can enjoy cruising with his foot kept away from the accelerator pedal.

There have been proposed various manners of controlling the vehicle speed by the cruise control device. A generally known example is as follows. When vehicle speed V is to be increased or decreased toward target speed VO set by the driver, a control mode suited to one of control regions determined by the magnitudes of the difference between the target speed VO, and the current vehicle speed V and the current acceleration is applied so that the vehicle speed V is brought to the target speed VO and maintained. More specifically, as the control mode in the individual control regions, a so-called PID control (proportional plus integral plus derivative control) is employed, in which gains adapted to a P (proportional) term, I (integral) term, etc. are set for the individual control regions.

Although the gains of the PID control are individually set to different values in different control regions, the setting values are invariable. If the gains are fixed at constant values, it is not possible to carry out a cruise control matched to both the high- and low-speed regions. Therefore, when the vehicle speed V is adjusted to the target speed VO by operating the cruise control device, the driving feeling is sometimes damaged.

Further, there is a prior art cruise control device which employs a control mode wherein the acceleration of the vehicle is once set at 0 when the vehicle speed V is brought close to the target speed VO. According to this control mode, however, the vehicle speed V is temporarily held at a constant value before the vehicle speed V reaches the target speed VO. Therefore, not only the time required for the vehicle speed V to reach the target speed VO is prolonged, but the driving feeling before the target speed VO is reached is damaged.

The control action carried out by the above-described cruise control device is determinately started by a turning-on of a set switch (which is usually arranged near the driver's seat) by a driver at the time the vehicle speed V reaches the target speed VO. However, the manual handling of the vehicle when the control action is started differs depending upon drivers. Namely, some drivers may continue to depress the accelerator pedal for a while even after the turning-on of the set switch, whereas others may release the accelerator pedal before turning on the set switch. Moreover, a time lag from the time the control action is started by the cruise control device until the engine output changes in response to the control action, i.e., response delay, is inevitable.

If the variation in manual handling of the vehicle when the set switch is turned on, described above, is combined with the response delay of the engine, the control action of the cruise control device cannot be smoothly carried out, more specifically, frequent and unnecessary opening/closing of the throttle valve of the vehicle may be executed by the control action, thus damaging the driving feeling. This disadvantage is particularly prominent when the cruising speed of the vehicle is low or the vehicle is running down a slope.

To reliably ensure safety, the control action executed by the above cruise control device is interrupted simultaneously with an operation of the transmission or the brake pedal of the vehicle, otherwise, the acceleration or deceleration of the vehicle would be disabled even if the driver depresses the accelerator pedal after operating the shift lever of the transmission or depresses the brake pedal, thus making it impossible to avoid an urgent danger during cruising.

When an urgent danger is avoided after the control action of the cruise control device is terminated, it is desirable to resume the previous cruising condition, and to this end, a cruise control device has been proposed which is capable of controlling the operation of the transmission, automatic transmission of the vehicle in this proposed case.

Specifically, the cruise control device of this type is provided with a resume switch independent of the above-mentioned set switch, and when the resume switch is turned on, a shift command signal is output to the automatic transmission to resume the previous cruising condition. For example, when the resume switch is turned on after the brake pedal is depressed to temporarily decrease the vehicle speed, the cruise control device outputs a shift command signal to the automatic transmission to shift down the transmission, and upon passage of a predetermined time after the vehicle speed V reaches the target speed VO, outputs a shift command signal to shift up the automatic transmission, to thereby quickly increase the vehicle speed V toward the target speed VO.

As will be understood from the above description, the shift control of the automatic transmission executed by the prior art cruise control device is started only by the turning-on of a switch, such as the resume switch etc. Therefore, when the cruise control is carried out while the vehicle is ascending a long slope, for example, the shift operation of the automatic transmission cannot be promptly effected even if the vehicle speed V largely drops from the target speed VO. Namely, the automatic transmission carries out a shift change operation independent of the shift command signal from the cruise control device, only when the vehicle speed or the amount of depression of the accelerator pedal meets the shift change condition, as conventionally known. Moreover, drivers usually set their foot away from the accelerator pedal when the vehicle is cruising, and accordingly, the depressing of the accelerator pedal by the driver, i.e., the shift change operation of the automatic transmission, is inevitably delayed.

Thus, the prior art cruise control device is disadvantageous in that the shift change control of the automatic transmission cannot be effectively carried out in accordance with the running condition of the vehicle and that the cruise control is interrupted, thus failing to ensure a satisfactory driving feeling which is the inherent purpose of the cruise control.

OBJECT AND SUMMARY OF THE INVENTION

An object of the present invention is to provide a cruise control device which can reliably ensure a satisfactory driving feeling regardless of the running speed of a motor vehicle and variation in manual handling depending on drivers at the start of a control action, or condition of a runway.

According to the present invention, there is provided a cruise control device which can achieve the above object, the device comprising a speed sensor for detecting an actual vehicle speed of the vehicle, means for setting a target vehicle speed, means for obtaining a vehicle speed deviation between the target vehicle speed and the actual vehicle speed, means previously provided with a plurality of control modes which are applied to control an operation parameter of the vehicle in accordance with the magnitude of the vehicle speed deviation, respectively, and means for selecting one of the control modes corresponding to the magnitude of the vehicle speed deviation, and for controlling the operation parameter in accordance with the selected control mode.

Preferably, one of the control modes is a fuzzy control, and to carry out the fuzzy control, there are provided a first rule which is applied to vary the operation parameter at a predetermined rate to decrease the output of the engine, when the vehicle speed deviation takes a positive value, a second rule which is applied to vary the operation parameter at a predetermined rate to increase the output of the engine, when the vehicle speed deviation takes a negative value, a third rule which is applied to vary the operation parameter at a rate greater than that employed in the first rule, to decrease the output of the engine, when an acceleration obtained from the difference between a vehicle speed deviation obtained last time and a vehicle speed deviation obtained this time takes a positive value, and a fourth rule which is applied to vary the operation parameter at a rate greater than that employed in the second rule, to increase the output of the engine, when the acceleration takes a negative value.

Further, for the fuzzy control, there are provided membership functions corresponding to the first to fourth rules, respectively, and varying the value thereof in accordance with the magnitude of the vehicle speed deviation, parameter functions corresponding to the first to fourth rules, respectively, for determining an amount of change of the operation parameter based on respective values of the membership functions, and a gain function for determining a gain based on a current value of the operation parameter.

In the fuzzy control, a first step of selecting one of the first to fourth rules corresponding to the membership function whose function value is the greatest among those obtained from the respective membership functions and obtaining the amount of change of the operation parameter from the parameter function corresponding to the selected rule, a second step of multiplying the amount of change of the operation parameter by the gain obtained from the gain function, and a third step of adding together the product obtained in the second step and a current value of the operation parameter, to obtain a target amount of change of the operation parameter, are sequentially executed.

One of the control modes is preferably a PID control, and in this PID control, a first step of obtaining an acceleration from the difference between a vehicle speed deviation obtained last time and a vehicle speed deviation obtained this time, a second step of obtaining a target acceleration corresponding to the vehicle speed, a third step of obtaining an acceleration deviation between the target acceleration and the obtained acceleration, a fourth step of obtaining products which are obtained by multiplying the vehicle speed deviation and the acceleration deviation respectively by a vehicle speed gain and acceleration gain determined in accordance with the vehicle speed, and obtaining an amount of change of the operation parameter based on the sum of the products, and a fifth step of adding together the amount of change of the operation parameter obtained in the fourth step and a current value of the operation parameter, to obtain a target amount of change of the operation parameter, are sequentially executed.

Further, one of the control modes is preferably a P control, and in this P control, a first step of obtaining an acceleration from the difference between a vehicle speed deviation obtained last time and a vehicle speed deviation obtained this time, a second step of obtaining a target acceleration determined in accordance with the acceleration, a third step of obtaining an acceleration deviation between the target acceleration and the obtained acceleration, a fourth step of adding together a product obtained by multiplying the acceleration deviation by an acceleration gain determined in accordance with the vehicle speed, and a correction value for correcting a change in engine output due to a variation in the number of revolutions of the engine, to obtain an amount of change of the operation parameter, and a fifth step of multiplying the amount of change of the operation parameter by a gain determined in accordance with a current value of the operation parameter and adding the current value of the operation parameter to the obtained product, to obtain a target amount of change of the operation parameter, are sequentially executed.

According to the above cruise control device, one of the control modes is selected based on the magnitude of the vehicle speed deviation between the vehicle speed and the target vehicle speed, and in accordance with the selected control mode, the vehicle speed is held close to the target vehicle speed. By properly setting one of the control modes based on the vehicle speed deviation and using a control gain suited to the respective control mode, a satisfactory driving feeling is ensured when the vehicle speed is maintained close to the target vehicle speed.

When the fuzzy control is selected, one rule is selected from the four rules based on the function values of the membership functions in accordance with the vehicle speed deviation and the acceleration, and the amount of change of the operation parameter is obtained from the parameter function corresponding to the selected rule. Since the gain used in this control is determined in accordance with the current value of the operation parameter, the vehicle speed control can be carried out stably regardless of the high or low speed region of the vehicle.

When the PID control is selected, the amount of change of the operation parameter is obtained by multiplying the vehicle speed deviation and the acceleration deviation respectively by the vehicle speed gain and the acceleration gain and then adding together the products thus obtained. Accordingly, when this control is executed and the vehicle speed approaches the target vehicle speed, the vehicle speed is not held at a constant value even temporarily. Further, since the vehicle speed gain and the acceleration gain are determined in accordance with the vehicle speed, the vehicle speed control can be carried out stably regardless of the high or low speed region.

When the P control is selected, the amount of change of the operation parameter is obtained taking account of a change in the engine output due to a change in the number of revolutions of the engine, whereby the response to the control is improved and the acceleration is stably maintained at a constant value while the vehicle speed control is carried out. Also in this case, the gain used is determined in accordance with the current value of the operation parameter, and accordingly, the vehicle speed control can be carried out stably regardless of the high or low speed region.

The present invention provides a further cruise control device which can achieve the above-mentioned object, the cruise control device comprising a speed sensor for detecting an actual vehicle speed of the vehicle, means for setting a target vehicle speed, a throttle opening sensor for periodically detecting the opening of the throttle valve of the engine, means for estimating a change in the vehicle speed on the assumption that the opening of the throttle valve detected this time by the throttle opening sensor is maintained until the opening of the throttle valve is detected next time, to obtain a correction value for the vehicle speed, means for obtaining a corrected vehicle speed by correcting the vehicle speed, detected by the speed sensor, by the correction value, and means for controlling the opening of the throttle valve based on the corrected vehicle speed, to bring the vehicle speed to the target vehicle speed.

According to the above cruise control device, the corrected vehicle speed is obtained, and the opening of the throttle valve is adjusted in accordance with the corrected vehicle speed to carry out the vehicle speed control, whereby frequent and unnecessary opening/closing of the throttle valve can be avoided. Further, the cruise control device can eliminate the adverse influence caused by the variation in manual handling depending on drivers at the start of the vehicle speed control.

The present invention provides a still further cruise control device which can achieve the above-mentioned object. This cruise control device indispensably includes an automatic transmission, and a shifting of the gear ratios of the automatic transmission is carried out based on a first shift diagram defined in accordance with the opening of the throttle valve and the vehicle speed.

The cruise control device further comprises means for preparing a second shift diagram applied during the cruise control and defining a gear ratio to be established in the automatic transmission in accordance with the opening of the throttle valve and the vehicle speed, a throttle opening sensor for detecting the opening of the throttle valve at least during the cruise control, a speed sensor for detecting the speed of the vehicle at least during the cruise control, and means for carrying out a shifting of the gear ratios of the automatic transmission in accordance with the opening of the throttle valve detected by the throttle opening sensor and the value of the vehicle speed detected by the speed sensor, based on the second shift diagram during the cruise control.

According to the above cruise control device, it is possible to carry out, during the cruise control, a shifting of the gear ratios of the automatic transmission based on the second shift diagram matched to this cruise control. Accordingly, the shifting of the automatic transmission can be executed at optimum timing during the cruise control.

The above and other objects, features and advantages of the invention will become more apparent from the ensuing detailed description taken in conjunction with the accompanying drawings.

BRIEF DESCRIPTION OF THE DRAWINGS

FIGS. 5 to 8 are diagrams each showing a membership function in accordance with one of four rules defined in the first embodiment;

FIGS. 9 to 12 are diagrams each showing a parameter function in accordance with one of the four rules, representing the relationship between a value of a membership function and a variable angle of a throttle valve;

FIG. 13 is a block diagram showing a manner of setting the target throttle opening in the fuzzy control mode;

DETAILED DESCRIPTION OF THE PREFERRED EMBODIMENTS

Figure 1:
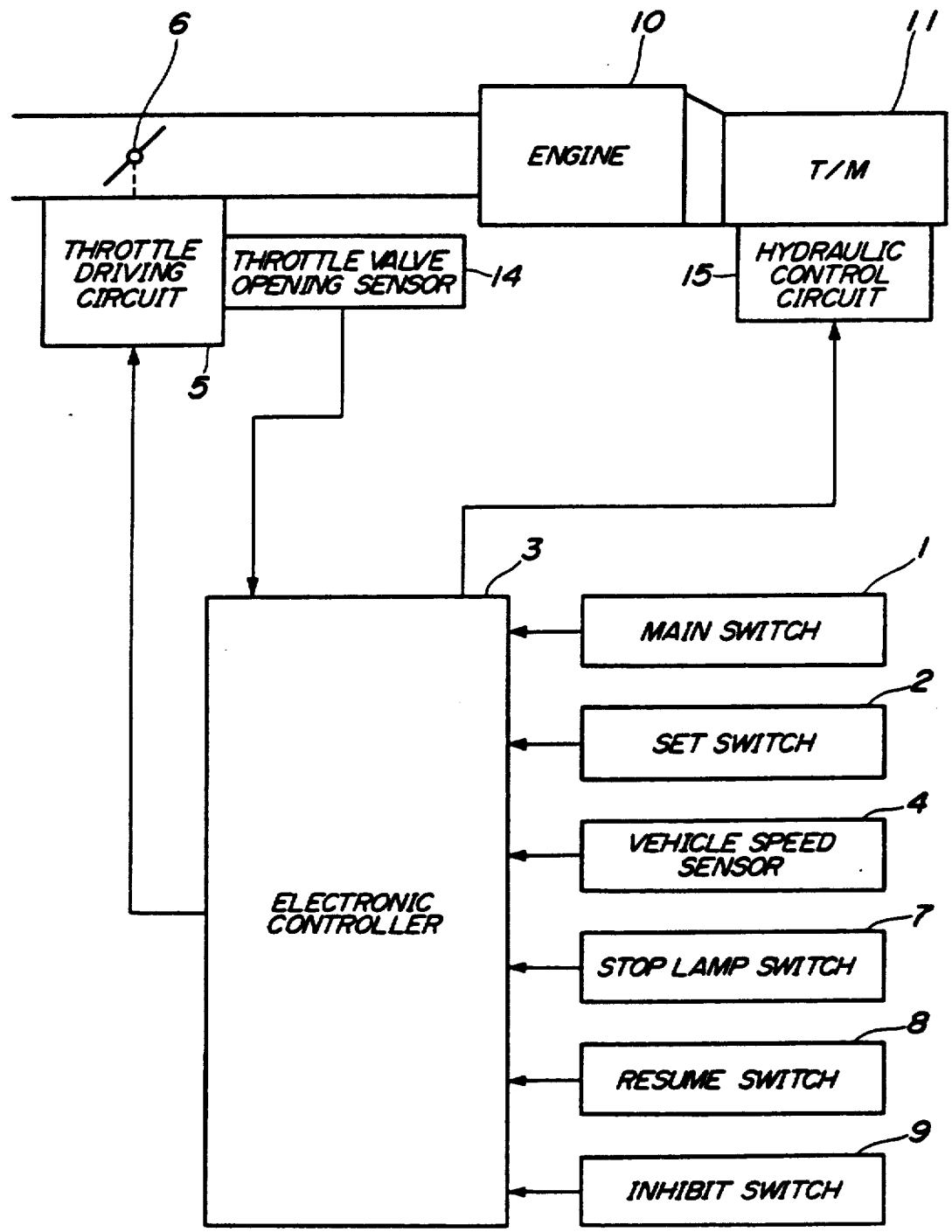
FIG. 1 is a schematic block diagram showing a cruise control device according to this invention.

FIG. 1 schematically shows a cruise control device for motor vehicles according to an embodiment of the present invention. The cruise control device which, in this embodiment, is applied to a motor vehicle equipped with a gasoline engine comprises a main switch 1, a set switch 2, a stop lamp switch 7, a resume switch 8, an inhibit switch 9, etc., and is also provided with a vehicle speed sensor 4 for detecting the speed of a motor vehicle. The signals from these switches 1, 2, 7, 8 and 9 and the vehicle speed sensor 4 are input to an electronic controller 3, which controls the operation of an automobile engine 10 to achieve cruising.

Here, a general function of a cruise control will be briefly described. A driver first turns on the main switch 1 to select an auto-cruise control, and after visually confirming through a speedometer (not shown) that a desired speed has been reached, manually turns on the set switch 2 to set a target vehicle speed (auto-cruise speed). When supplied with the signals from the main switch 1 and the set switch 2, the electronic controller 3 calculates a deviation between the target vehicle speed and an actual vehicle speed determined by a vehicle speed signal from the vehicle speed sensor 4 and controls the opening of a throttle valve 6 based on the deviation by means of a throttle driving circuit 5 in accordance with a predetermined control mode stored internally beforehand, i.e., a control program. Accordingly, the output of the engine 10 is adjusted so that the actual vehicle speed is maintained at the set target vehicle speed.

If the driver depresses a brake pedal (not shown) during the cruise control, the stop lamp switch 7, which is interlocked with the brake pedal and functions as a cancel switch, is turned on. Upon receiving a signal from the stop lamp switch 7, the electronic controller 3 cancels the cruise control, i.e., auto-cruise drive. If the resume switch 8 is thereafter turned on by the driver, the above-mentioned auto-cruise drive is resumed by the electronic controller 3. If a shift lever (not shown) of an automatic transmission 11 is shifted to a neutral position by the driver, the inhibit switch 9, which is interlocked with the shift lever and functions as a cancel switch, is turned on. Also in this case, the electronic controller 3 cancels the auto-cruise drive when supplied with a signal from the inhibit switch 9. Thus, the auto-cruise drive is canceled when the automatic transmission 11 is shifted to the neutral position and the driving force of the engine 10 is then not transmitted to wheels, whereby an undesirable racing of the engine can be prevented.

The resume switch 8 and the set switch 2, which are used to resume the auto-cruise drive and set the target vehicle speed as mentioned above, may be designed to provide other functions by altering the control program in the electronic controller 3. For example, the vehicle may be accelerated while the resume switch 8 is continuously depressed by the driver during the auto-cruise drive and a vehicle speed at the time when the driver removes his finger from the resume switch 8 may be set as a new target vehicle speed, and the vehicle may be decelerated while the set switch 2 is continuously depressed by the driver during the auto-cruise drive and a vehicle speed at the time when the driver removes his finger from the set switch 2 may be set as a new target vehicle speed.

In FIG. 1, reference numeral 14 denotes a throttle valve opening sensor for detecting the opening of the throttle valve 6, and 15 denotes a hydraulic control circuit for shifting the transmission gears of the automatic transmission 11 in response to control signals from the electronic controller 3.

Now, the function of the electronic controller 3 according to an embodiment of the invention will be described in detail.

Figure 2:
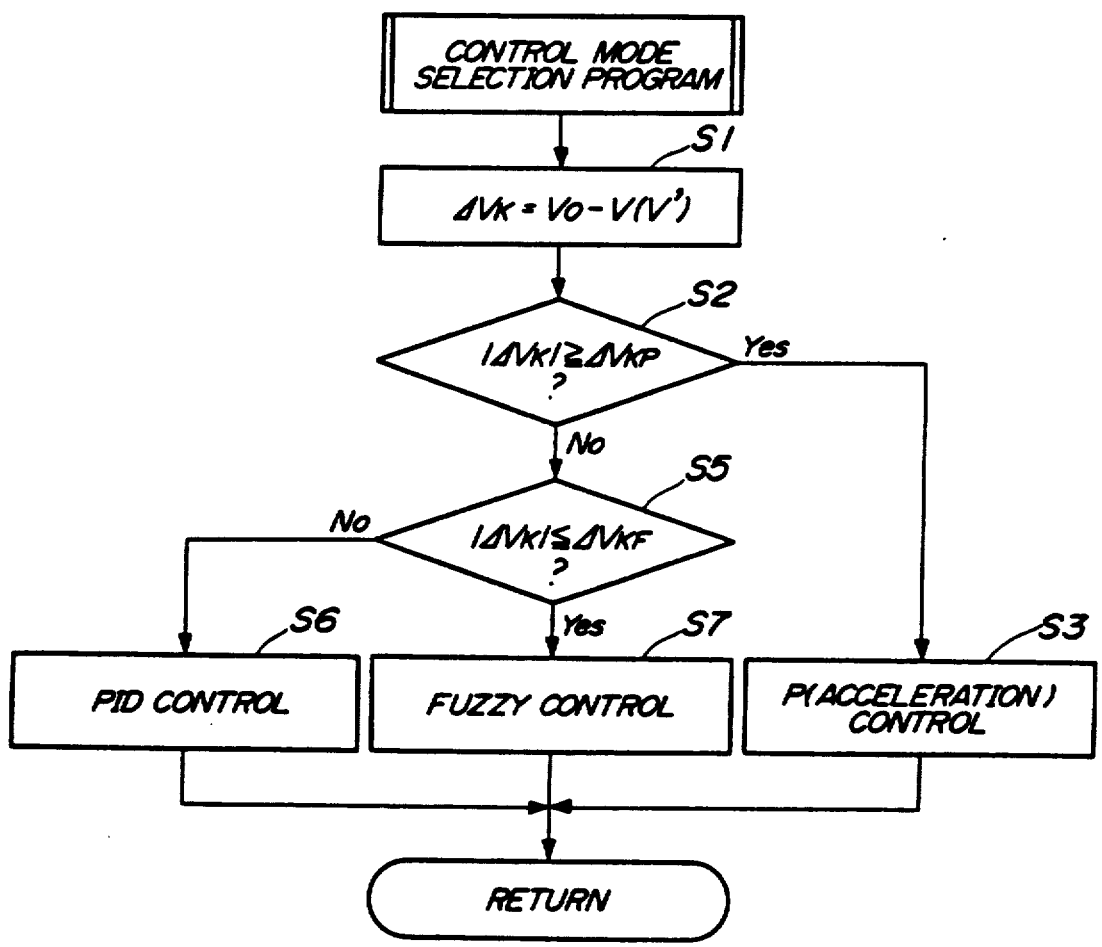
FIG. 2 is a flowchart of a control mode selection process executed in a first embodiment of the invention.

When the target vehicle speed (auto-cruise speed) VO is set by turning on the main switch 1 and the set switch 2 as mentioned above, the electronic controller 3 first selects a control mode to be employed for the vehicle speed control. FIG. 2 shows a process for a control mode selection executed by the electronic controller 3. First, the electronic controller 3 calculates current vehicle speed V, based on the signal from the vehicle speed sensor 4, to calculate vehicle speed deviation $\Delta Vk$ ($=VO-V$) between the target vehicle speed VO and the vehicle speed V (Step S1). Then, in Step S2, the electronic controller 3 determines whether the absolute value of the vehicle speed deviation $\Delta Vk$ is greater than a predetermined threshold value $\Delta VKP$ (e.g., 8 to 3 km/hr). If the absolute value is greater than the threshold value $\Delta VKP$, the program proceeds to Step S3 to carry out a P (constant acceleration) control.

If the decision in Step S2 is negative (No), the program proceeds to Step S5 wherein it is determined whether the absolute value of the vehicle speed deviation $\Delta Vk$ is smaller than a predetermined threshold value $\Delta VKF$ (e.g., 5 to 1 km/hr). If the decision is negative, that is, if the absolute value of the vehicle speed deviation $\Delta Vk$ is between the aforesaid threshold value $\Delta VKP$ and the threshold value $\Delta VKF$, Step S6 is executed to carry out the PID control. If the decision in Step S5 is affirmative (Yes), Step S7 is executed to carry out a fuzzy control.

Figure 3:
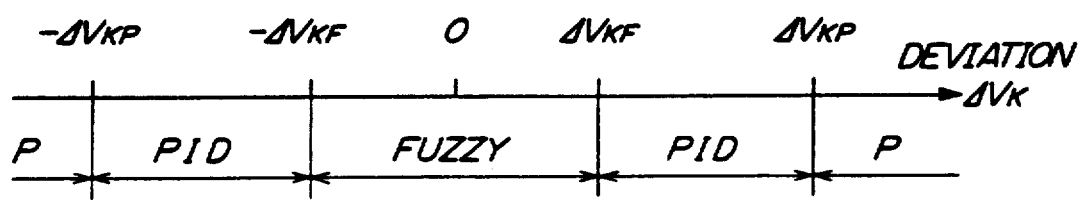
FIG. 3 is a diagram showing control mode regions with respect to vehicle speed deviation.

FIG. 3 shows regions of the control modes selected in the above-described manner. As is clear from the foregoing, one of these regions of the control modes is selected based solely on the vehicle speed deviation $\Delta Vk$.

Next, the fuzzy control which is carried out in Step S7 when the vehicle speed deviation $\Delta Vk$ is small will be described.

Before explaining the control mode according to the present invention, a prior art control mode employed when the vehicle speed deviation is small is described. According to the prior art, the PID control is employed regardless of the selected control mode, and integration constant KI and proportional constant KP for individual PID controls of the control modes are set at fixed values. Accordingly, even when the vehicle speed deviation ΔVk is small, the target throttle opening θn is obtained in the same manner as in the other control modes, by the following equations:

$$\theta n = \theta n - 1 + \Delta\theta \quad \text{(C1)}$$

$$\Delta\theta = KI \times (VO - V) - KP \times A \quad \text{(C2)}$$

where θn is the target opening of the throttle valve 6, Δθ is the angle over which the throttle valve 6 is driven this time by the throttle driving circuit 5 to vary the throttle opening, θn−1 is the sum of throttle angle changes up to the last time, i.e., the current opening of the throttle valve 6, and A is the value obtained through a detection of the acceleration of the vehicle.

In the PID controls according to the prior art, the constants KI and KP are fixed, and therefore, although the control operation matches a high-speed travel of the vehicle, it does not match a low-speed travel.

According to the fuzzy control of the present invention, in contrast, four rules are provided. If one of them is selected, the opening of the throttle valve is controlled in accordance with the selected rule. Specifically, the four rules are:

Rule 1: The throttle valve 6 is slightly driven toward a closed position thereof if the deviation ΔVk is negative.

Rule 2: The throttle valve 6 is slightly driven toward an open position if the deviation ΔVk is positive.

Rule 3: The throttle valve 6 is largely driven toward the closed position if the acceleration A is positive.

Rule 4: The throttle valve 6 is largely driven toward the open position if the acceleration A is negative.

In selecting one of these rules, first, the vehicle speed deviation ΔVk and the acceleration A are calculated by the electronic controller 3. The vehicle speed deviation ΔVk is obtained in the same manner as in Step S1 of FIG. 2, and the acceleration A is obtained from the following equation:

$$A = \Delta Vk - \Delta Vk - 1 \quad \text{(1)}$$

where ΔVk is the vehicle speed deviation obtained this time, and ΔVk−1 is the vehicle speed deviation obtained last time.

Next, using the vehicle speed deviation ΔVk and the acceleration A thus obtained, function values μ1 to μ4 are obtained from membership functions set for the respective rules. FIGS. 5 to 8 are graphs showing the membership functions set for the above-mentioned Rules 1 to 4, respectively. The membership functions are previously stored in the electronic controller 3.

The function μ1 calculated based on the membership function shown in FIG. 5 linearly increases with the vehicle speed V and takes a value between 0 and 1 when the absolute value of the vehicle speed deviation ΔVk between the vehicle speed V and the target vehicle speed VO falls within a predetermined range ΔVks1 (e.g., 1 to 3 km/hr). When the vehicle speed V is smaller than the target vehicle speed VO by more than the value ΔVks1, the function μ1 takes a minimum value of 0, and when the vehicle speed V is greater than the target vehicle speed VO by more than the predetermined value ΔVks1, the function μ1 takes a maximum value of 1.

Similarly, the function μ2 calculated based on the membership function shown in FIG. 6 linearly decreases with an increase in the vehicle speed V and takes a value between 1 and 0 when the vehicle speed deviation ΔVk is within the predetermined range ΔVks1. When the vehicle speed V is smaller than the target vehicle speed VO by more than the value ΔVks1, the function μ2 takes a maximum value of 1, and when the vehicle speed V is greater than the target vehicle speed VO by more than the value ΔVks1, the function μ2 takes a minimum value of 0.

The function μ3 calculated based on the membership function shown in FIG. 7 linearly increases with an increase in the acceleration A and takes a value between 0 and 1 when the absolute value of the acceleration A falls within a predetermined range AL1 (e.g., 0.1 to 1.0 km/hr/sec). When the acceleration A is smaller than −AL1, the function μ3 takes a minimum value of 0, and when the acceleration A is greater than AL1, the function μ3 takes a maximum value of 1.

The function μ4 calculated based on the membership function shown in FIG. 8 linearly decreases with an increase in the acceleration A and takes a value between 1 and 0 when the absolute value of the acceleration A falls within the range of AL1. When the acceleration A is smaller than −AL1, the function μ4 takes a maximum value of 1, and when the acceleration A is greater than AL1, the function μ4 takes a minimum value of 0.

After the functions μ1 to μ4 are obtained from the above-mentioned membership functions, a rule corresponding to the greatest of these membership functions μ1 to μ4 is selected. Note, various modifications are possible in respect of the membership functions shown in FIGS. 5 to 8, and the maximum and minimum values need not be identical among the membership functions.

Next, the displacement angle Δθ of the valve member of the throttle valve 6 is calculated in accordance with the selected rule; specifically, it can be obtained from the graphs or parameter functions of FIGS. 9 to 12 set corresponding to the respective rules. The graphs of FIGS. 9 to 12 are stored in the electronic controller 3.

In calculating the displacement angle Δθ of the throttle valve, if the function μ1 is the greatest among the four functions and accordingly Rule 1 is selected, displacement angle Δθ1 is calculated from the graph of FIG. 9 corresponding to FIG. 5. As is noted from the graph of FIG. 9, when the function μ1 takes the maximum value of 1, displacement angle Δθ1 is −ΔθS1 (in this embodiment, ΔθS1 is set to a value falling within the range of 0.01 to 0.05 (volts), for example), and when the function μ1 takes the minimum value of 0, the displacement angle Δθ1 is ΔθS1. When the function μ1 takes a value between the maximum value 1 and the minimum value 0, the displacement angle Δθ1 takes a value which is inversely proportional to the value of the function μ1 between −ΔθS1 and ΔθS1. Namely, as the function μ1 decreases, the displacement angle Δθ linearly increases from the value −ΔθS1 toward the value ΔθS1. In this embodiment, the value ΔθS1 is expressed in units of volts, because the opening of the throttle valve 6 is controlled by a voltage applied thereto from the throttle driving circuit 5 shown in FIG. 1.

When Rule 2 is selected, displacement angle Δθ2 for the throttle valve is calculated based on the graph shown in FIG. 10. The graph of FIG. 10 is in an opposite relation to the graph of FIG. 9, and accordingly, when the function μ2 takes the maximum value 1, the displacement angle Δθ2 is ΔθS1, and when the function μ2 takes the minimum value 0, the displacement angle Δθ2 is −ΔθS1.

When Rule 3 or 4 is selected, displacement angle $\Delta\theta 3$ or $\Delta\theta 4$ for the throttle valve is calculated based on the graph shown in FIG. 11 or 12. As is clear from the graph of FIG. 11, when the function $\mu 3$ takes the maximum value 1, the displacement angle $\Delta\theta 3$ is $-\Delta\theta L1$ (in this embodiment, $\Delta\theta L1$ is set to a value falling within the range of 0.02 to 0.08 (volts), for example), and when the function $\mu 3$ takes the minimum value 0, the displacement angle $\Delta\theta 3$ is $\Delta\theta L1$. Regarding the displacement angle $\Delta\theta 4$, as noted from the graph of FIG. 12, when the function $\mu 4$ takes the maximum value 1, the displacement angle $\Delta\theta 4$ is $\Delta\theta L1$, and when the function $\mu 4$ takes the minimum value 0, the displacement angle $\Delta\theta 4$ is $-\Delta\theta L1$. The value $\Delta\theta L1$ should be set to a value greater than $\Delta\theta S1$.

One of the displacement angles $\Delta\theta 1$ to $\Delta\theta 4$ obtained in the aforesaid manner is substituted for displacement angle $\Delta\theta$ in equation (2), to obtain the target throttle opening $\theta n$.

$$\theta n = \theta n - 1 + KG \times \Delta\theta \qquad (2)$$

where $\theta n - 1$ is the current opening of the throttle valve 6, i.e., the target throttle opening set last time.

KG is the coefficient (nonlinear gain) set in accordance with the target throttle opening $\theta n$, and in practice, the target throttle opening $\theta n - 1$ set last time is used instead of the target throttle opening $\theta n$.

Figure 4:
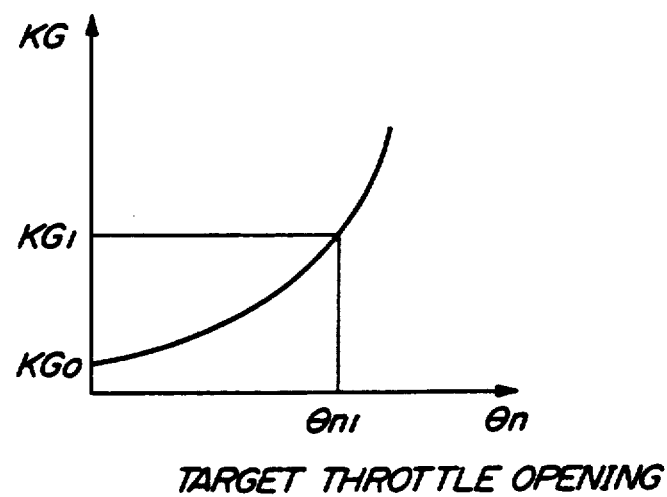
FIG. 4 is a graph showing the relationship between target throttle opening $\theta n$ and coefficient KG.

The graph of FIG. 4 shows the relationship between the target throttle opening $\theta n$ and the coefficient KG. The target throttle opening $\theta n$ can be expressed by a voltage value (V) corresponding to the valve opening signal of the throttle valve 6 detected by the throttle valve opening sensor 14. For example, when the target throttle opening $\theta n$ is $\theta 0$ (0 V), the coefficient KG is set to KG0 (e.g., 0.1 to 1.0), and when the target throttle opening $\theta n$ is $\theta n1$ (e.g., 2.5 V), the coefficient KG is set to KG1 (e.g., 4 to 5).

In setting the coefficient KG, throttle valve opening signal Vth detected by the throttle valve opening sensor 14 may be directly used, instead of the above-mentioned target throttle opening $\theta n$.

FIG. 13 shows part of the electronic controller 3 in the form of an equivalent analog circuit, which calculates the target throttle opening $\theta n$ in accordance with the above-described fuzzy control. In FIG. 13, arithmetic circuits 21a to 24a corresponding to Rules 1 to 4, respectively, have the function of calculating the functions $\mu 1$ to $\mu 4$ from the membership functions, and arithmetic circuits 21b to 24b have the function of calculating the displacement angles $\Delta\theta 1$ to $\Delta\theta 4$ of the throttle valve from the functions $\mu 1$ to $\mu 4$ obtained by the arithmetic circuits 21a to 24a and the graphs of FIGS. 9 to 12, respectively. A selector circuit 20 selects one of the displacement angles $\Delta\theta 1$ to $\Delta\theta 4$ corresponding to the greatest of the four functions $\mu 1$ to $\mu 4$ and supplies the selected displacement angle $\Delta\theta$ to an arithmetic circuit 25. In FIG. 13, reference numeral 26 denotes an arithmetic circuit for calculating the target throttle opening $\theta n$, and 27 and 28 denote arithmetic circuits for calculating the vehicle speed deviation $\Delta Vk$ and the acceleration A, respectively.

As mentioned above, in a vehicle speed control according to the fuzzy control mode, one rule is selected based on the values of the functions $\mu 1$ to $\mu 4$, thereby determining to which of the acceleration A and the vehicle speed deviation $\Delta Vk$ should be given more importance, and the displacement angle $\Delta\theta$ of the throttle valve is calculated in accordance with the selected rule and delivered to the arithmetic circuit 25. In this embodiment, the arithmetic circuit 25 multiplies the displacement angle $\Delta\theta$ by the coefficient KG determined from the graph of FIG. 4 in accordance with the current target throttle opening $\theta n$, and the arithmetic circuit 26 adds together the obtained product and the last throttle opening $\theta n1$, to obtain the target throttle opening $\theta n$. Thus, according the vehicle speed control in the fuzzy control mode of the invention, one rule is selected based on the values of the functions $\mu 1$ to $\mu 4$, and the value of the coefficient KG is varied in accordance with the target throttle opening $\theta n$, whereby the vehicle speed control can be carried out stably over the entire vehicle driving region from high to low speed driving regions.

Next, the control mode executed in the aforesaid Step S6 when the vehicle speed deviation $\Delta Vk$ is medium, i.e., the PID control, will be described.

Before explaining the PID control employed in the present invention, a prior art PID control will be described. According to the prior art PID control, the target throttle opening $\theta n$ for the throttle valve 6 is calculated from the aforesaid equation (C1), and the displacement angle $\Delta\theta$ of the throttle valve to be changed this time by the throttle driving circuit 5 is obtained from the following equation (C3):

$$\Delta\theta = KI \times (VO - V) - KP \times A \qquad (C3)$$

where KI and KP are coefficients (gains), and A is the current acceleration.

According to the prior art PID control, the target acceleration is 0, and KI and KP are constants. Therefore, while the vehicle speed V varies toward the target speed VO, the vehicle speed V is temporarily held at a constant value, and thus time required for the vehicle speed V to reach the target speed VO is prolonged.

In contrast, according to the PID control of the present invention, the displacement angle $\Delta\theta$ of the throttle valve is given by the following equation:

$$\Delta\theta = KI \times (VO - V) + KP \times (AO - A) \qquad (3)$$

Figure 14:
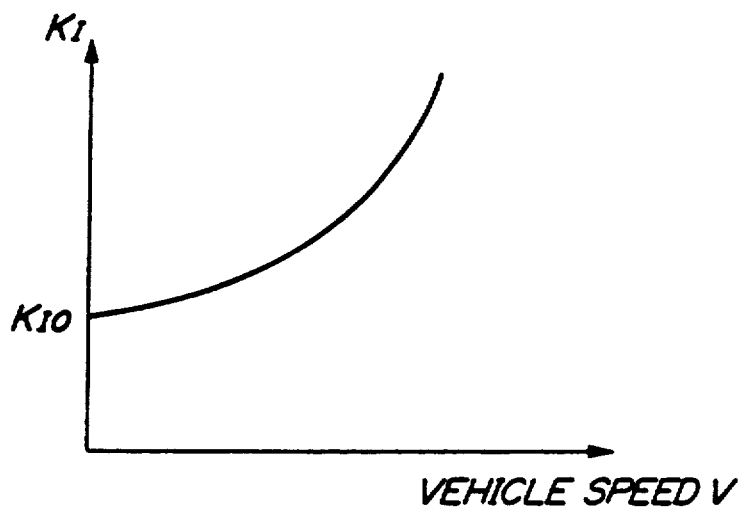
FIG. 14 is a graph showing the relationship between coefficient KI used in PID control and vehicle speed V.
Figure 15:
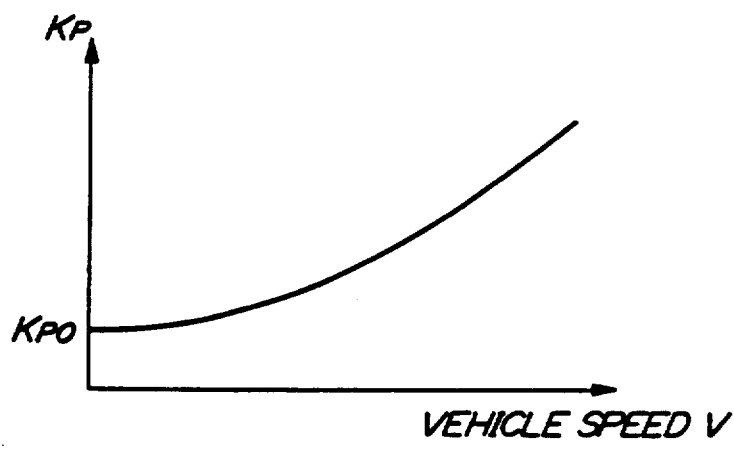
FIG. 15 is a graph showing the relationship between value KP and vehicle speed V.

KI and KP in equation (3) are the coefficients determined in accordance with the vehicle speed. FIGS. 14 and 15 show the relationship between the coefficient KI and the vehicle speed V and between the coefficient KP and the vehicle speed V, respectively. As noted from the figures, the coefficients KI and KP increase more sharply as the vehicle speed increases.

Symbol AO denotes the target acceleration, which is determined in the following manner in accordance with the vehicle speed V, the deviation $\Delta Vk$, and the acceleration A. First, acceleration aO corresponding to the vehicle speed V is obtained from the graph shown in FIG. 16. As is clear from the graph, the acceleration aO linearly decreases with an increase in the vehicle speed V, and is set to a predetermined value aO1 (e.g., 2.5 km/hr/sec) when the vehicle speed V is 0, and set to 0 when the vehicle speed V is higher than a predetermined speed VaO (e.g., 120 km/hr).

Based on the acceleration aO thus obtained, the target acceleration AO is set as indicated in the following table:

| Accelera- | Deviation ΔVk | | |
|---|---|---|---|
| tion A | Positive | 0 | Negative |
| Positive | A0 = a0 | — | A0 = −a0 |
| 0 | A0 = a0 | — | A0 = −a0 |
| Negative | A0 = a0 | — | A0 = −a0 |

Figure 16:
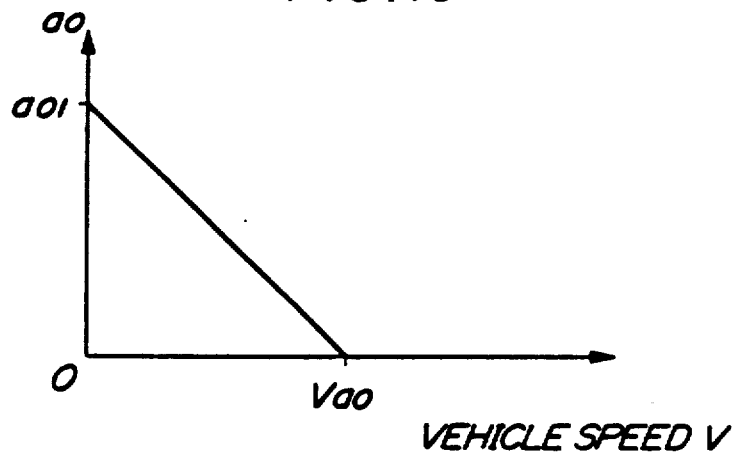
FIG. 16 is a graph showing the relationship between target acceleration aO and vehicle speed V.

By controlling the opening of the throttle valve 6 by using the target throttle opening θn obtained from equation (3), based on the graphs of FIGS. 14 to 16 and the table described above, the vehicle speed V can be smoothly and quickly brought to the target vehicle speed VO without being temporarily held at a constant value, since the target acceleration AO and the coefficients (gains) KI and KP are determined in accordance with the vehicle speed V, whereby a satisfactory driving feeling is ensured.

Next, the control mode executed in the aforesaid Step S3 when the vehicle speed deviation ΔVk is large, i.e., the P (acceleration) control, will be described.

Prior to the explanation of the control mode employed in the present invention, the P control according to a prior art control mode, executed when the vehicle speed deviation ΔVk is large, will be described. According to the prior art P control, the displacement angle $\Delta\theta$ of the throttle valve is calculated from the following equation, for example:

$$\Delta\theta = KP \times (AO - A) \tag{C4}$$

where KP represents a constant (gain), AO represents the target acceleration, and A represents the current acceleration.

In the prior art P control, KP is constant, and therefore, a stable control cannot be obtained in both the high and low speed driving regions.

In contrast, according to the P control of the present invention, the displacement angle $\Delta\theta$ of the throttle valve is calculated from the following equation:

$$\Delta\theta = KG \times (KP \times (AO - A) + DO) \tag{4}$$

KP, AO, and A are substantially identical with the corresponding ones used in equation (C4). DO is the correction variable which is used to correct the torque variable in response to a change in the number of revolutions of the engine, and is a function of the engine revolution number. Generally, when the throttle opening is maintained at a constant value, the torque decreases with an increase in the engine revolution number, and therefore, DO is set to a value necessary to compensate for such a decrease of the torque. KG is the coefficient (nonlinear gain) set in accordance with the target throttle opening θn, and is determined from the graph of FIG. 4 in accordance with the target throttle valve θn, as mentioned above.

Thus, according to the P control of the invention, variation of the torque in response to a change in the engine revolution number is corrected beforehand by using the correction variable DO, and the displacement angle $\Delta\theta$ of the throttle valve is calculated by using the coefficient KG variable in accordance with the target throttle opening θn, whereby a stable acceleration can be maintained and a satisfactory driving feeling is ensured.

The graphs of FIGS. 14 to 16 and the aforesaid table are stored in the electronic controller 3.

Now, an example of a vehicle speed control executed by the cruise control device of the invention will be described with reference to FIGS. 17 to 21.

Figure 17:
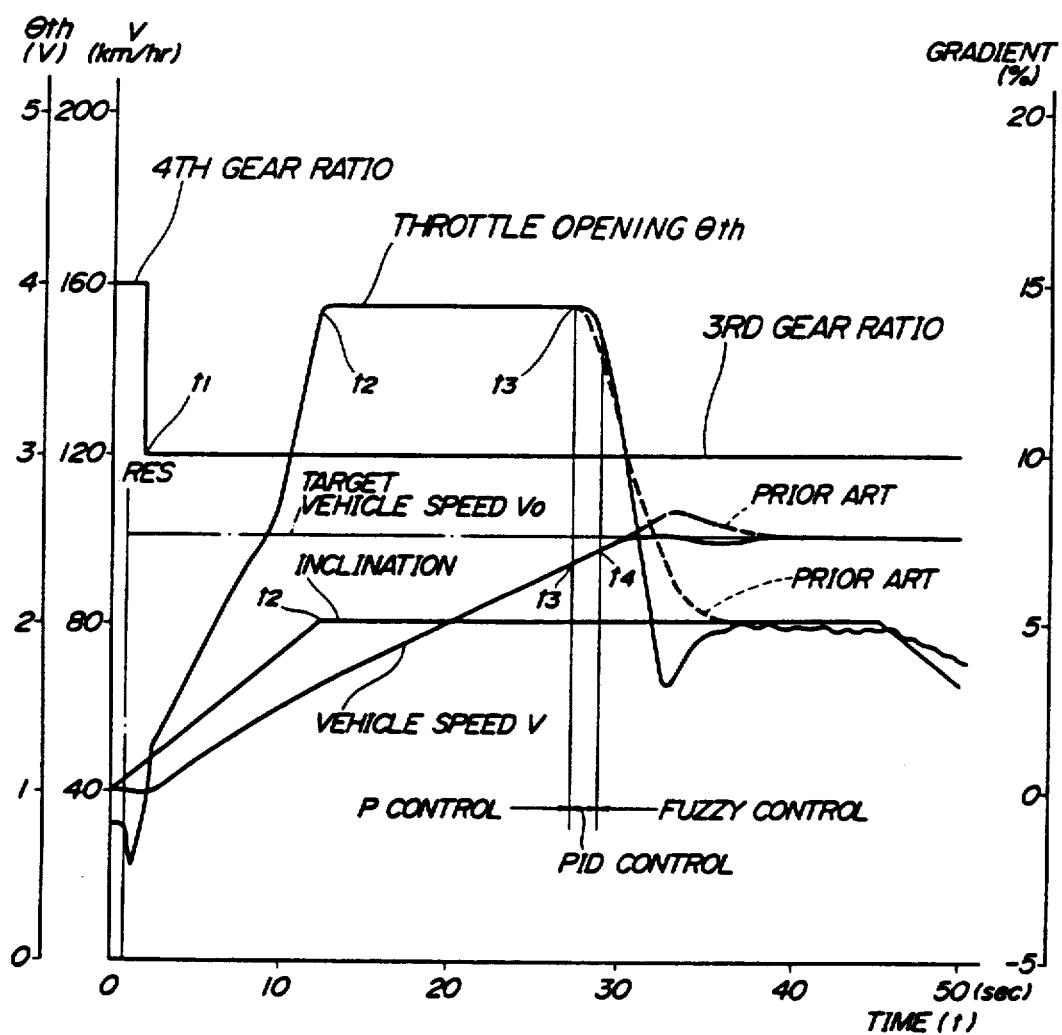
FIGS. 17 to 21 are graphs each showing a result of a vehicle speed control by the cruise control device.

The example of a vehicle speed control shown in FIG. 17 illustrates a case in which the resume switch 8 is turned on so that the vehicle speed V is brought to the target vehicle speed 100 km/hr from 40 km/hr, and wherein the throttle opening θth detected by the throttle valve opening sensor 14 is indicated along the vertical axis, and the rate of change of the vehicle speed V with time, detected by the vehicle speed sensor 4, is indicated along the horizontal axis. In this example, it is assumed that the vehicle runs on a slope as shown in the figure, and the automatic transmission 11 is shifted down from the fourth to the third gear ratio.

More specifically, the P control is started and the automatic transmission 11 is shifted down from the fourth to the third gear ratio immediately after the time t2 at which the resume switch 8 is turned on. By the time t3 at which the PID control is to be started, the target throttle opening θn is adjusted such that the acceleration A becomes equal to the target acceleration AO (constant acceleration), whereby the vehicle speed V is increased at a substantially constant rate and the throttle opening becomes full-open at the time t2.

At the time t3 at which the vehicle speed deviation ΔVk between the vehicle speed V and the target vehicle speed VO is within the range ΔVKP, the PID control is started. In this case, the target acceleration AO is not set to 0, unlike the prior art control, and accordingly, the vehicle speed V is increased toward the target speed VO, without being held at a constant value even temporarily.

At the time t4 at which the vehicle speed deviation ΔVk between the vehicle speed V and the target vehicle speed VO falls within the range ΔVKF, the fuzzy control is started. In the fuzzy control, it is determined which one of the rules should be preferentially selected, based on the values of the functions obtained from the membership functions. In the example of FIG. 17, the acceleration A is positive, and accordingly, the aforesaid Rule 3 for largely driving the valve member of the throttle valve 6 toward the closed position is selected. Thus, the throttle opening θth is reduced more quickly than in the case of the prior art PID control, whereby the acceleration A is promptly reduced to 0 and thus the vehicle speed V is quickly brought to the target vehicle speed VO.

If the prior art PID control is employed, the reduction of the acceleration A is small and the vehicle speed V overshoots the target vehicle speed VO, as indicated by the broken lines in FIG. 17. Therefore, a longer time is required before the vehicle speed V is brought to the target vehicle speed VO.

Figure 18:
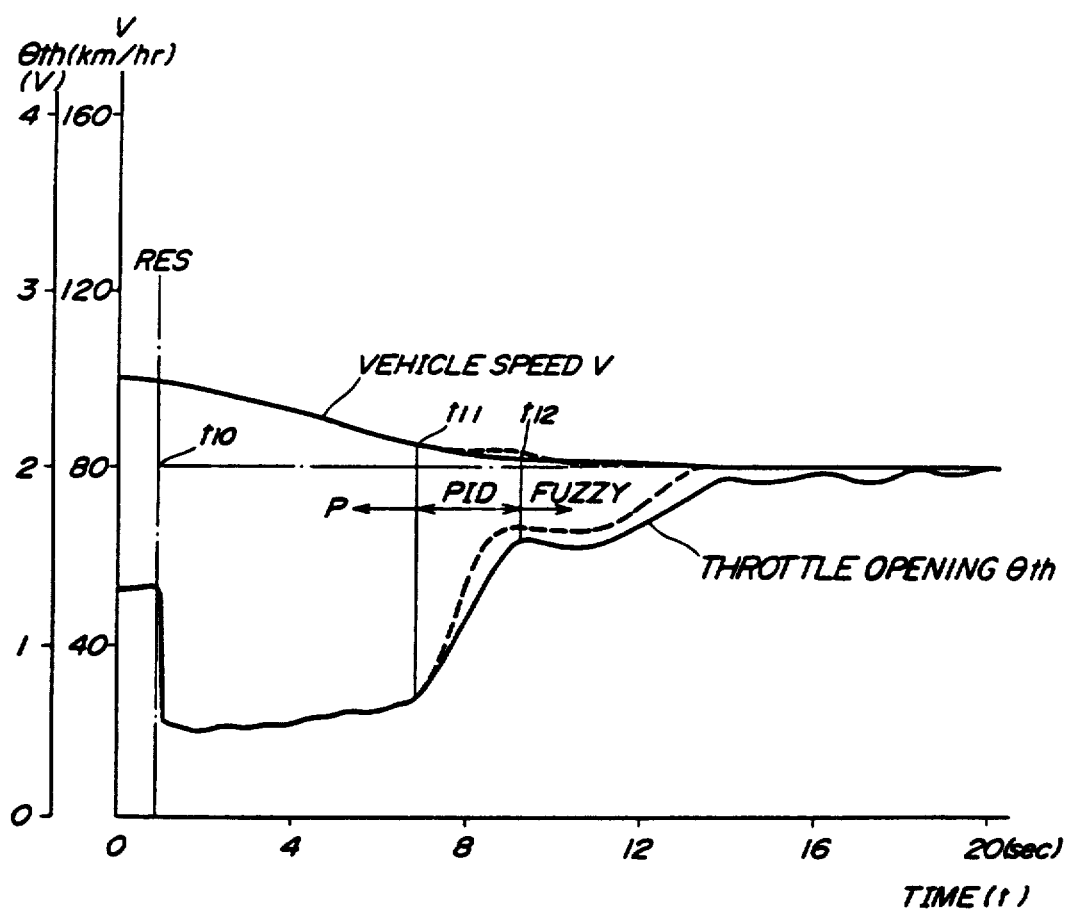

FIG. 18 shows a case in which the resume switch 8 is turned on so that the vehicle speed V is brought to the target speed 80 km/hr from 100 km/hr. In the example of FIG. 18, the P control is executed between the time t10 at which the resume switch 8 is turned on and the time t11, the PID control is executed between the time t11 and the time t12, and the fuzzy control is executed after the time t12.

According to the prior art vehicle speed control, while the PID control is carried out from the time t11 to the time t12, there is a region in which the target acceleration AO is set to 0, as indicated by the broken lines in FIG. 18. In this region, the throttle opening θth is increased to a larger extent than in the case of the PID control of the present invention, and accordingly, the vehicle speed V is temporarily held at a constant value.

According to the PID control of the invention, although a slightly longer time is required to reach the target vehicle speed VO, as compared to the prior art PID control, the vehicle speed V is not held at a constant value even temporarily, but is smoothly decreased toward the target vehicle speed VO, whereby a satisfactory driving feeling is ensured.

Figure 19:
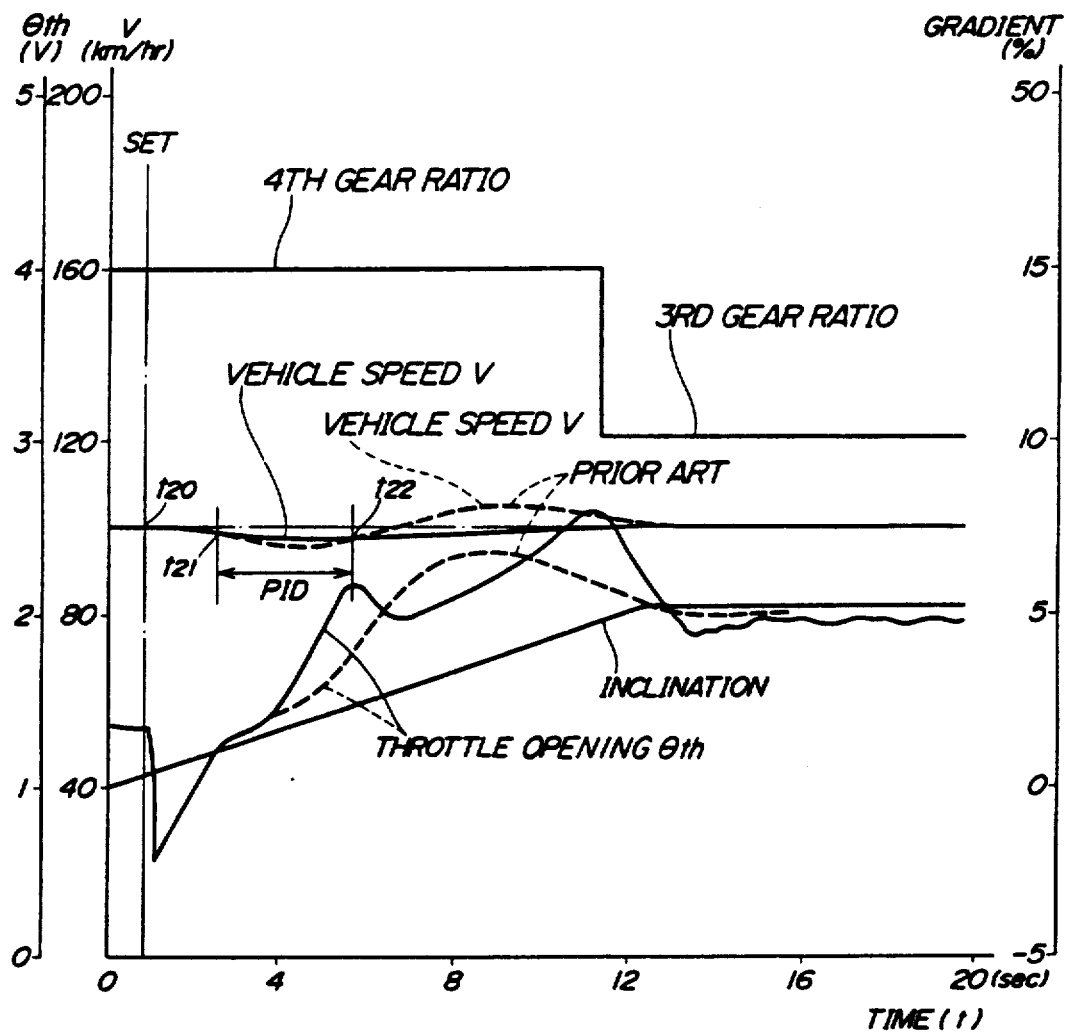

FIG. 19 shows a case in which the set switch 2 is turned on at the time t20 when the speed of the vehicle ascending a slope reaches 100 km/hr and the control mode is shifted to the cruise control. Since the vehicle is ascending a slope, the vehicle speed V decreases immediately after the shifting to the cruise control, and therefore, the PID control is executed between the time t21 and the time t22 and the fuzzy control is executed from the time t22 at which the vehicle speed V rises. In this case, according to the PID control of the invention which is executed between the time t21 and the time t22, to quickly bring the decreased vehicle speed V to the target speed VO, the throttle valve 6 is opened relatively early in comparison to the prior art PID control, whereby the vehicle speed V is smoothly returned to the target speed VO, without being fluctuated about the target vehicle speed VO.

Figure 20:
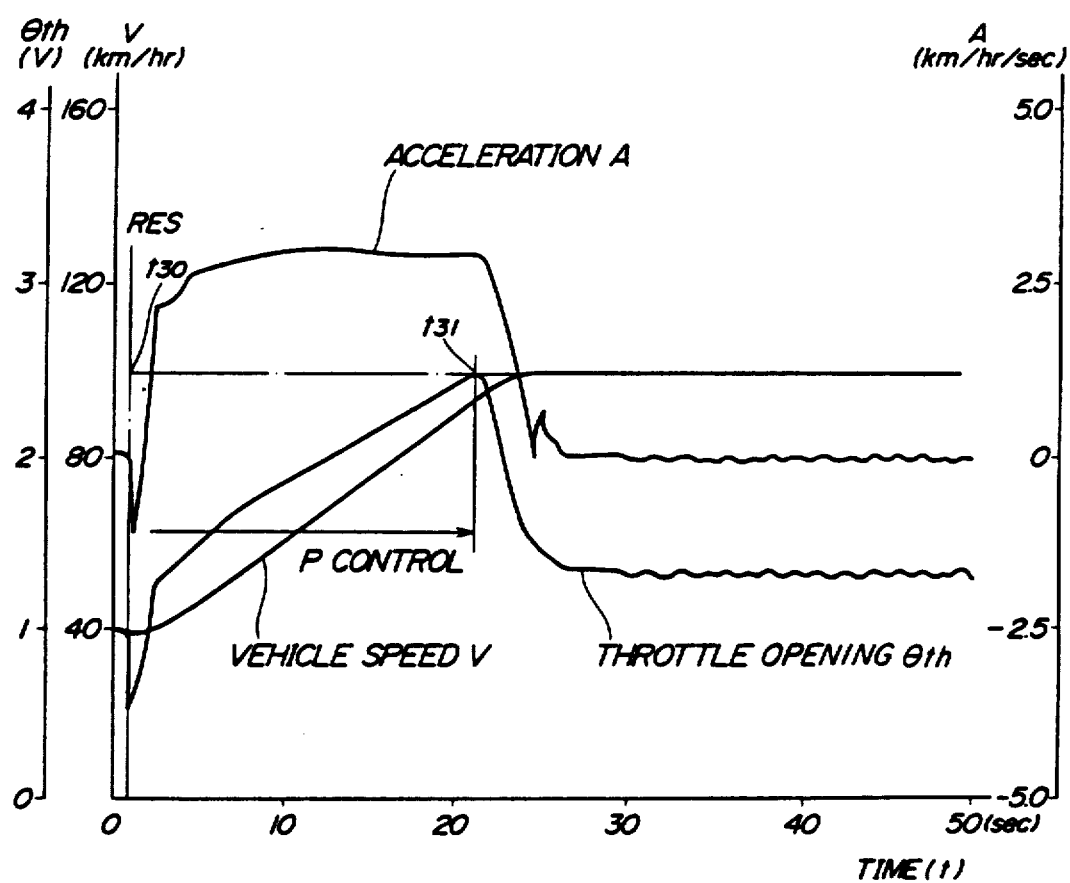

FIG. 20 shows a case in which the resume switch 8 is turned on while the vehicle is running on a flat surface so that the vehicle speed V is returned to the target speed 100 km/hr from 40 km/hr. Between the time t30 at which the resume switch 8 is turned on and the time t31 at which the vehicle speed deviation $\Delta Vk$ between the target speed VO and the vehicle speed V falls within the range $\Delta VKP$, the P control for constant acceleration is carried out. Accordingly, the throttle valve 6 is quickly opened to attain the target acceleration AO, and the throttle opening $\theta$th is increased to maintain the target acceleration AO. Thus, the vehicle speed V is smoothly increased toward the target vehicle speed VO.

Figure 21:
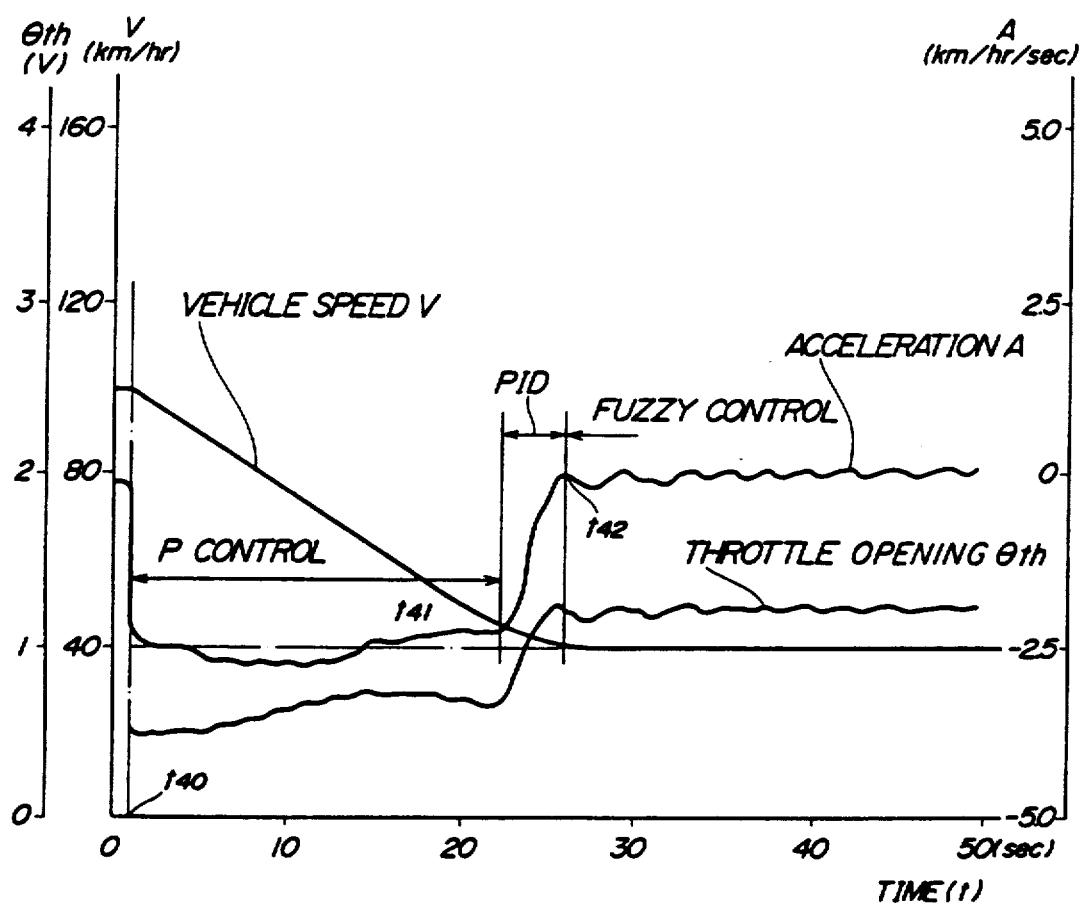

FIG. 21 shows a case in which the resume switch 8 is turned on while the vehicle is running down a gentle slope (gradient: 5%) so that the vehicle speed is returned to a target speed of 40 km/hr from 100 km/hr. The P control for constant acceleration is executed between the time t40 at which the resume switch 8 is turned on and the time t41 at which the vehicle speed deviation $\Delta Vk$ between the target vehicle speed VO and the vehicle speed V falls within the range $\Delta VKP$, and the PID control is executed between the time t41 and the time t42. After the time t42, the fuzzy control is executed.

In this case, since the vehicle is running down a slope, the throttle valve opening is maintained at a substantially constant value, to hold the acceleration A, which is negative, at a constant value, and during this term, the vehicle speed V is smoothly decreased at a constant rate. In the PID control between the time t41 and the time t42, the throttle opening is quickly increased to promptly bring the acceleration A to 0, and thereafter the fuzzy control is carried out.

In the above embodiment, the cruise control device of the present invention is applied to a vehicle equipped with a gasoline engine, and the throttle opening of the throttle valve 6 is used as an operation parameter for adjusting the engine output. The invention, however, is not limited to this alone and can be applied to a control of the fuel injection quantity, etc., instead of the throttle opening. Further, the invention can be equally applied to vehicles equipped with a diesel engine.

Now, a second embodiment of the present invention will be described.

Figure 22:
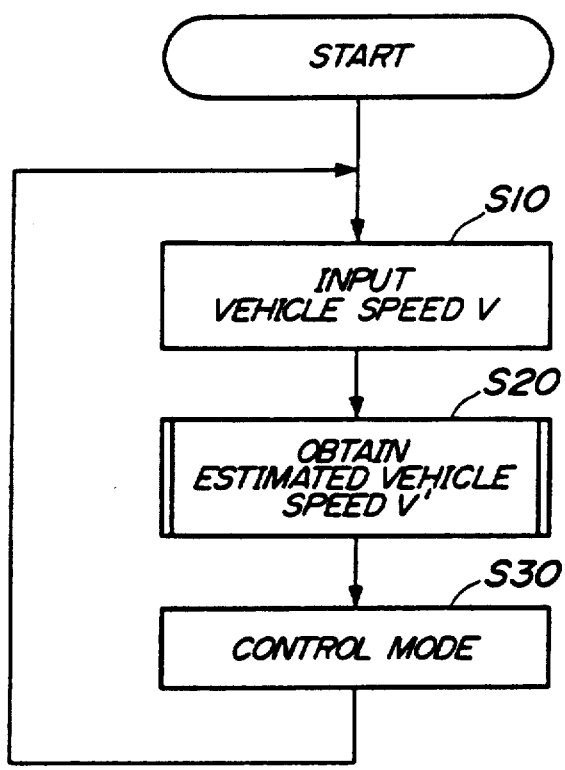
FIG. 22 is a flowchart of a main routine executed in a second embodiment of the invention.

In the second embodiment, the process shown in the flowchart of FIG. 22 is executed at predetermined periods to carry out the cruise control. Specifically, when the main switch 1 and the set switch 2 are turned on and thus the target vehicle speed VO is set, the electronic controller 3 obtains the vehicle speed V from the vehicle speed signal provided by the vehicle speed sensor 4, in Step S10. In the following Step S20, estimated vehicle speed V' is calculated. The estimated vehicle speed V' represents, as described in detail hereinafter, the estimated quantity by which the vehicle speed will change by the time the vehicle speed is detected next time, provided that the current throttle opening $\theta$th is maintained. In Step S30, the electronic controller 3 carries out the cruise control by using the estimated vehicle speed V', in accordance with a control mode.

The vehicle speed control in Step S30 is executed in accordance with the same flowchart as that shown in FIG. 2 and accordingly description thereof is omitted, but note, in the second embodiment, the estimated vehicle speed V', instead of the actual vehicle speed V, is used in Step S1 of FIG. 2. Similarly, for the second embodiment, the vehicle speed V appearing in FIGS. 5 and 6 is replaced by the estimated vehicle speed V'. Furthermore, regarding the aforesaid equation (2), it is noted that, when the fuzzy control is executed immediately after the start of the vehicle speed control, target throttle opening $\theta$n is set to an initial value which is previously set in accordance with the target vehicle speed VO taking account of a run on a surface of 0% gradient.

Figure 23:
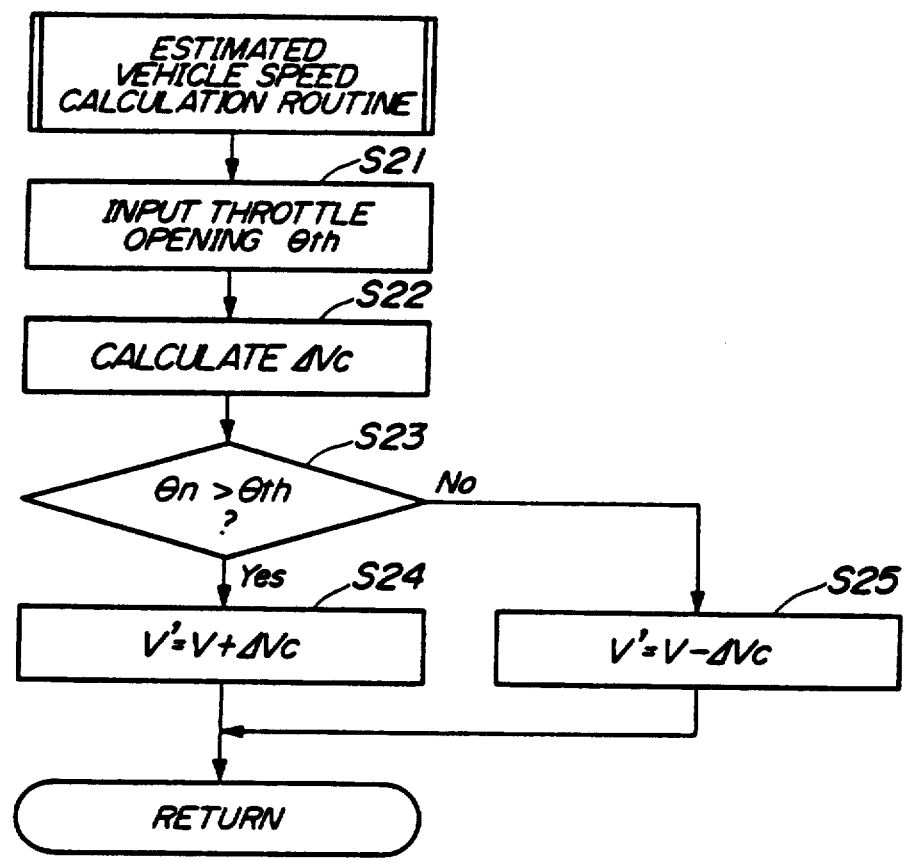
FIG. 23 is a flowchart of a process for obtaining an estimated vehicle speed.

Next, the calculation routine for the estimated vehicle speed V', executed in Step S20 in FIG. 22, will be described with reference to the flowchart shown in FIG. 23.

Figure 24:
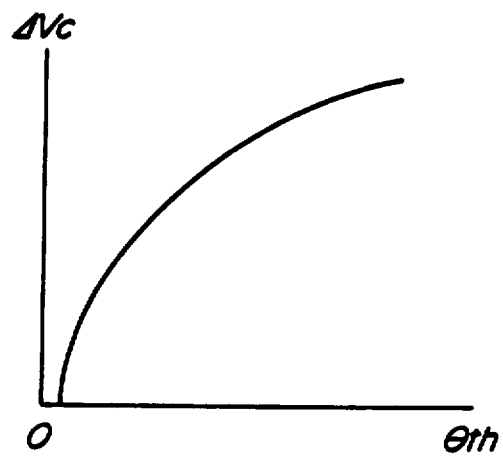
FIG. 24 is a graph showing the relationship between throttle opening $\theta th$ and vehicle speed correction $\Delta Vc$.

First, the electronic controller 3 is supplied with the current throttle opening, i.e., the throttle opening $\theta$th based on the detection signal from the throttle valve opening sensor 14, in Step S21. In Step S22, vehicle speed correction $\Delta Vc$ is calculated. The vehicle speed correction $\Delta Vc$ represents the estimated amount of change of the vehicle speed V within one sampling period, provided the current throttle opening $\theta$th is maintained until the throttle opening is detected at the next sampling. The vehicle speed correction $\Delta Vc$ can be estimated in various manners; for example, it can be determined from the graph of FIG. 24 in accordance with the current throttle opening $\theta$th. The graph of FIG. 24 is experimentally obtained and represents a vehicle speed correction value $\Delta Vc$ which is required when the vehicle runs on an ordinary road of 0% gradient. In practice, various vehicle speed correction values $\Delta Vc$ corresponding to a plurality of throttle opening values $\theta$th are stored in a memory in the electronic controller 3 in the form of a table, and a conventional interpolation is applied to obtain a vehicle speed correction value $\Delta Vc$ corresponding to the detected throttle opening value $\theta$th.

Next, in Step S23, it is determined whether or not the target throttle opening $\theta$n is greater than the detected throttle opening $\theta$th, namely, whether the vehicle speed V should be increased or decreased till the next sampling. In this case, as the target throttle opening $\theta$n, the value set last time may be used. If the decision in Step S23 is Yes, the flow proceeds to Step S24, in which the above vehicle speed correction value ΔVc is added to the value of the vehicle speed V detected by the vehicle speed sensor 4 and the sum obtained is set as the estimated vehicle speed V' (=V+ΔVc). If the decision in Step S23 is No, Step S25 is executed in which the above vehicle speed correction value ΔVc is subtracted from the detected value of the vehicle speed V and the difference obtained is set as the estimated vehicle speed (V'=V−ΔVc).

The vehicle speed V' estimated in this manner is used for the vehicle speed control in the flowchart of FIG. 2.

Figure 25:
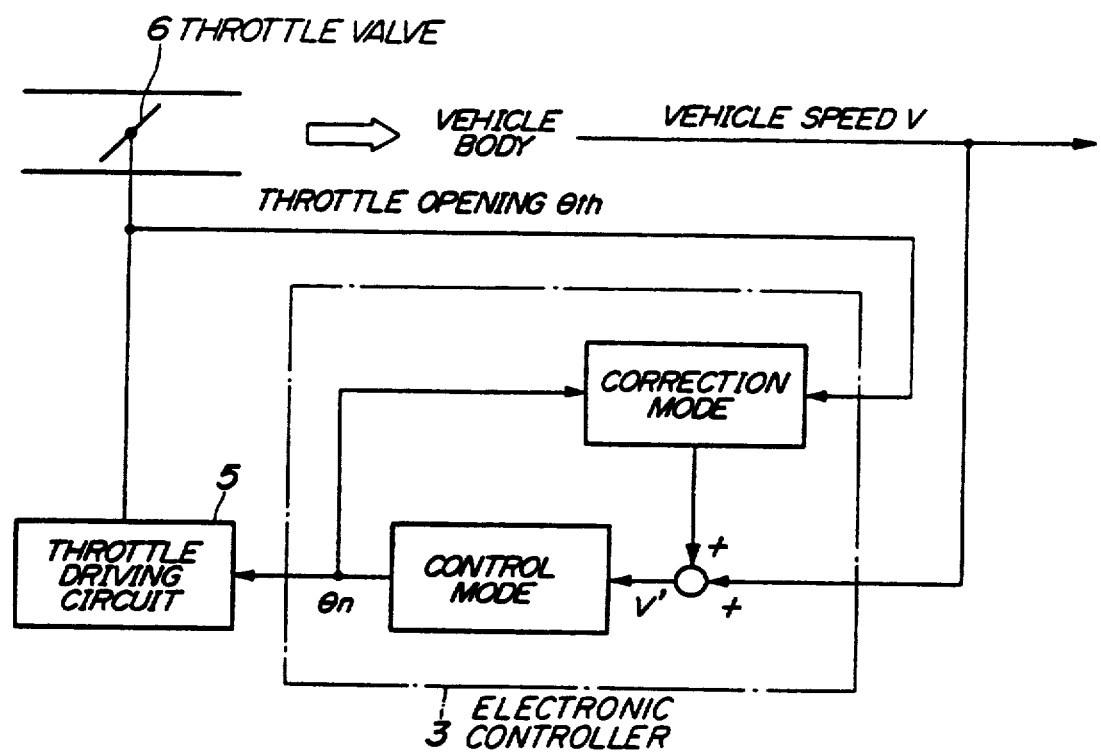
FIG. 25 is a circuit diagram showing a manner of obtaining target throttle opening $\theta n$.

FIG. 25 is a block diagram illustrating the flow of the calculation of the vehicle speed correction V', application of the same to the control mode, etc.

Figure 26:
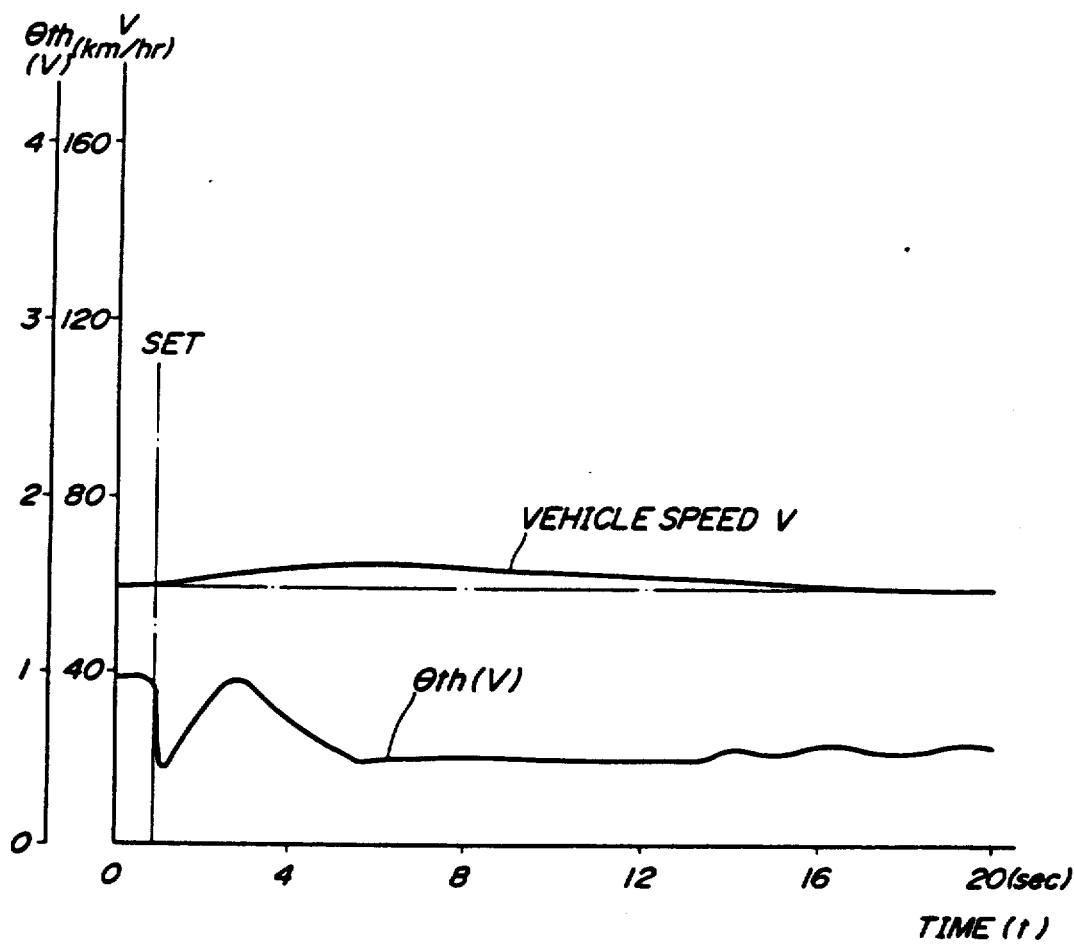
FIG. 26 is a graph showing the result of a vehicle speed control taking no account of vehicle speed correction.

FIG. 26 shows changes of the vehicle speed V and throttle opening θth with time when the set switch 2 is turned on while the vehicle is running on a slope of −3% gradient at a constant speed of 60 km/hr and the vehicle speed correction ΔVc is set to 0 at the setting of the target vehicle speed VO, namely, the correction of the vehicle speed V is not carried out. Immediately after the start of the vehicle speed control, the target throttle opening θn is set to an initial value which is previously set in accordance with the target vehicle speed VO taking account of running on a surface of 0% gradient, as mentioned above. Therefore, the throttle valve 6 is largely opened for a moment and thus the vehicle speed V overshoots the target vehicle speed VO.

Figure 27:
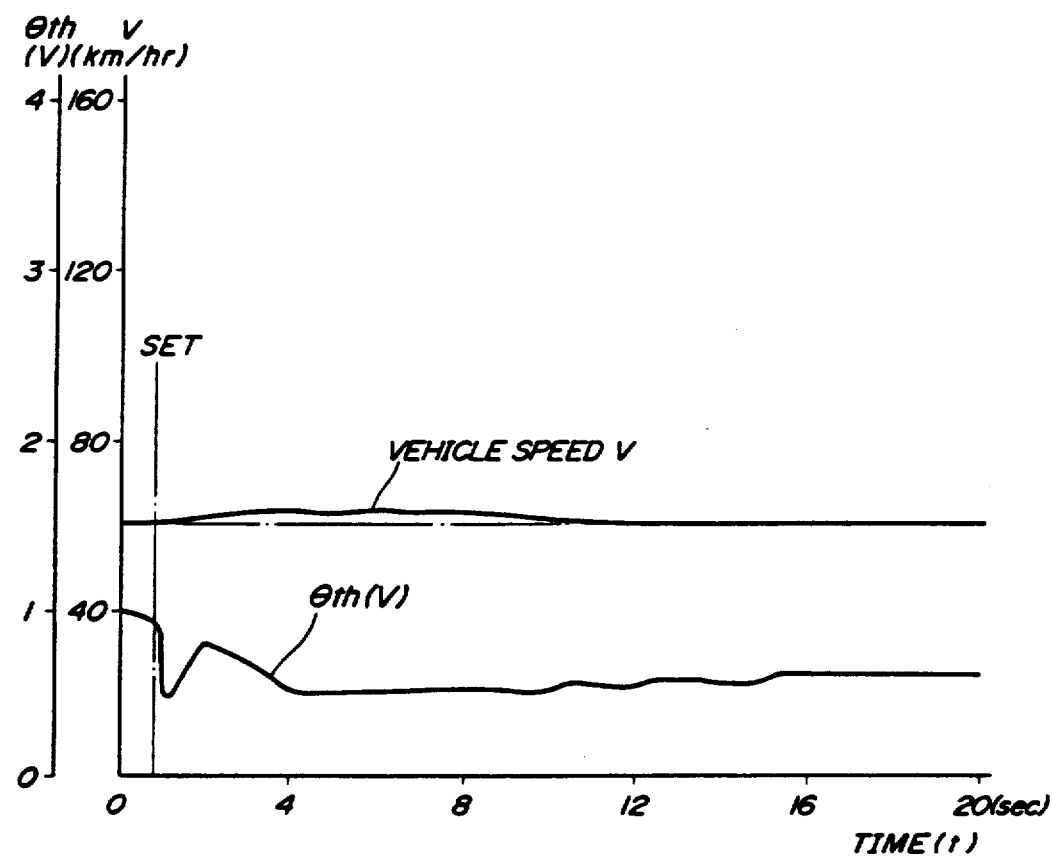
FIGS. 27 and 28 are graphs each showing a result of a vehicle speed control taking account of vehicle speed correction.
Figure 28:
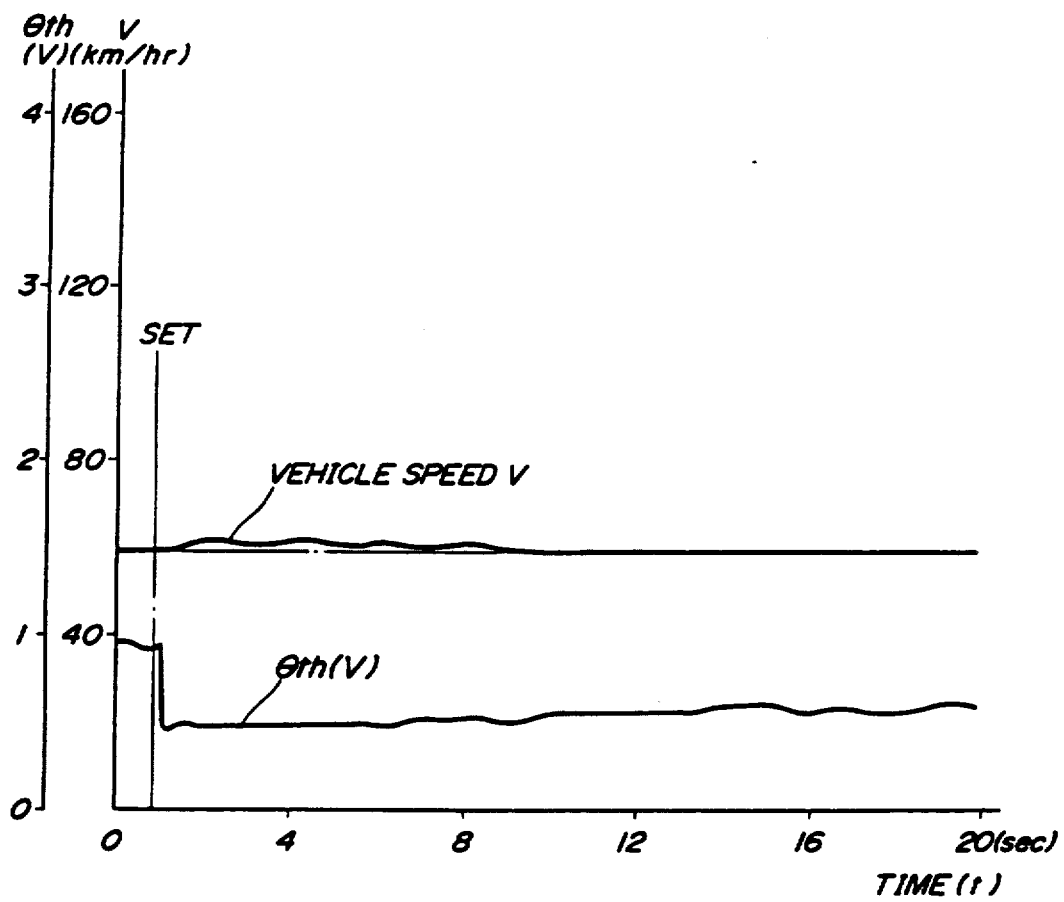

FIGS. 27 and 28 show the results of experiments conducted under the same running conditions as in the case of FIG. 26, namely, the set switch 2 is turned on while the vehicle is running on a slope of −3% gradient at a constant speed of 60 km/hr, wherein the vehicle speed correction ΔVc is taken account of at the setting of the target vehicle speed VO. The vehicle speed correction ΔVc, which is determined by the detected throttle opening θth, is replaced by a throttle opening corresponding to 0.01 V in the experiment of FIG. 27, and is replaced by a throttle opening corresponding to 0.015 V in the experiment of FIG. 28.

As will be understood from FIGS. 27 and 28 compared with FIG. 26, correcting the detected vehicle speed V by suitable vehicle speed correction ΔVc serves to lessen the overshooting of the vehicle speed at the start of the vehicle speed control and provide a satisfactory driving feeling.

Now, a cruise control according to a third embodiment of the present invention will be described.

Also in the third embodiment, the flowchart of FIG. 2 described with reference to the first embodiment is executed.

According to the third embodiment, the cruise control device additionally has the function of shifting the automatic transmission 11 from the fourth to the third gear ratio, or vice versa, by outputting a shift command signal during the auto-cruise drive. This shift-down operation is carried out in accordance with the flowchart shown in FIG. 29.

Figure 29:
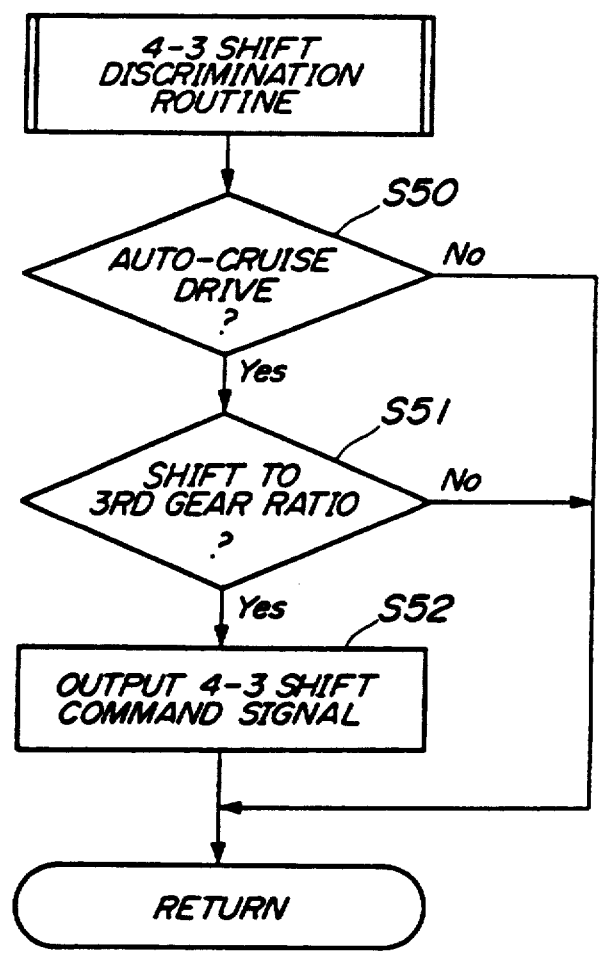
FIG. 29 is a flowchart of a process for discriminating a shifting of transmission gears of an automatic transmission, executed in a third embodiment of the invention.

In the flowchart of FIG. 29, it is determined in Step S50 whether or not the auto-cruise drive is under way. If No in Step S50, the electronic controller 3 of the cruise control device ends the 4-3 shift discrimination routine, and if Yes in Step S50, Step S51 is executed wherein it is determined whether the gear ratio should be shifted to the third gear ratio.

Figure 30:
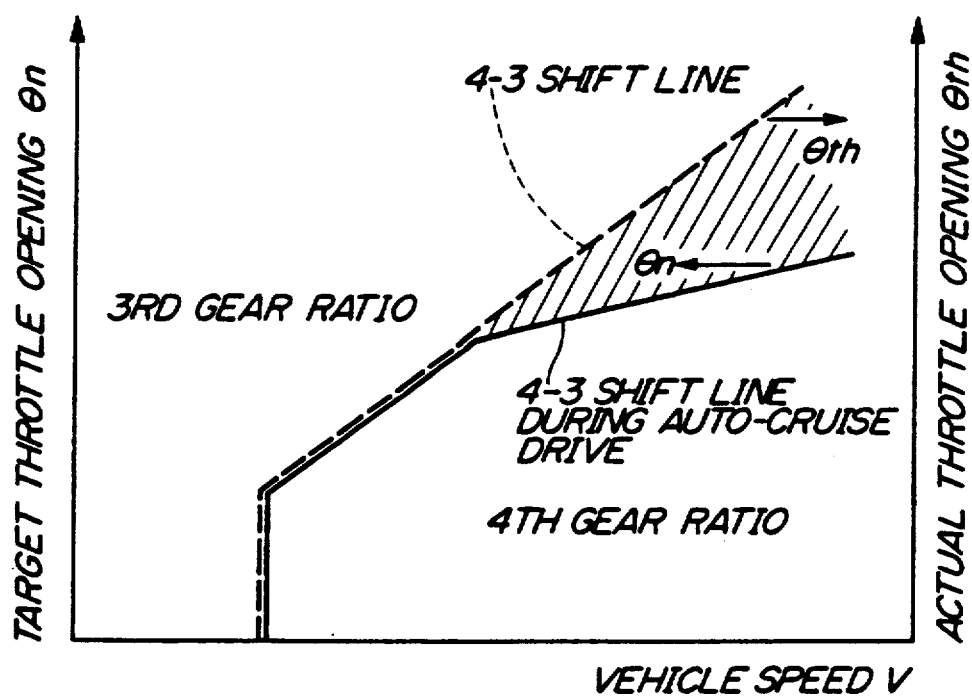
FIG. 30 is a 4-3 shift diagram showing a criterion based on vehicle speed V and target throttle opening $\theta n$ for shifting transmission gears of an automatic transmission from the fourth gear ratio to the third gear ratio.

FIG. 30 is a 4-3 shift diagram used for the determination in Step S51. This shift diagram is previously stored in a memory in the electronic controller 3. Thus, as seen in FIG. 30, the second shift diagram (4-3 shift line during auto-cruise drive (solid line in FIG. 30)) includes a region in which the throttle opening is smaller than that of the first shift diagram (4-3 shift line (broken line)) at the same vehicle speed.

As is clear from the shift diagram of FIG. 30, the operating region defining the gear ratio to be established is divided in terms of the target throttle opening θn and vehicle speed V. The 4-3 shift diagram is set taking account of a running condition on a slope of a predetermined gradient, but can be applied to a running condition on a flat surface. The broken line in FIG. 30 shows a 4-3 shift line for the automatic transmission 11, which makes a discrimination of the 4-3 shift based on the vehicle speed V and the actual throttle opening θth.

The electronic controller 3 determines the gear ratio to be established, in accordance with the vehicle speed V detected by the vehicle speed sensor 4 and, like the first embodiment, the set target throttle opening θn. If it is determined from the 4-3 shift diagram of the solid line shown in FIG. 30 that the gear ratio of the automatic transmission 11 should be the fourth gear ratio, namely, if the decision in Step S51 is No, the discrimination routine is ended. On the other hand, if it is determined that the gear ratio of the automatic transmission 11 should be the third gear ratio, namely, if the decision in Step S51 is Yes, the electronic controller 3 outputs a 4-3 shift command signal to the hydraulic control circuit 15 of the automatic transmission 11, to thereby shift the gear ratio of the automatic transmission 11 from the fourth to the third gear ratio.

As will be understood from FIG. 30, when the actual throttle opening θth and the target throttle opening θn fall within the region hatched in the figure, a shift command signal based on the full-line 4-3 shift diagram is supplied to the automatic transmission 11, whereby the automatic transmission 11 is shifted from the fourth to the third gear ratio, regardless of its own 4-3 shift diagram (broken line) also shown in FIG. 30.

In the third embodiment, the shifting of the automatic transmission 11 in accordance with the shift command signal is carried out based on the full-line 4-3 shift diagram, and thus the delay of shifting of the automatic transmission 11 can be avoided. More specifically, according to the prior art cruise control device, when the vehicle is ascending a long slope, no shift command is output and accordingly the gear ratio of the automatic transmission 11 is shifted based solely on its own 4-3 shift diagram. Therefore, the shifting to the third gear ratio is effected after the actual throttle opening θth varies beyond the broken line in FIG. 30 into the third gear ratio region, whereby the shift timing is delayed. In contrast, the cruise control device of the present invention can eliminate such a delay in the shift timing.

A determination as to whether a 4-3 shift should be carried out by the electronic controller 3 is made according to the 4-3 shift line during the auto-cruise drive, indicated by the full line in FIG. 30, based on the vehicle speed V and the target throttle opening θn; but the determination may be made based on the vehicle speed V and actual throttle opening θth.

Next, a process of shifting the automatic transmission 11 from the third to the fourth gear ratio by outputting a shift command signal from the cruise control device of the invention, i.e., the electronic controller 3, during the auto-cruise drive will be described.

Figure 31:
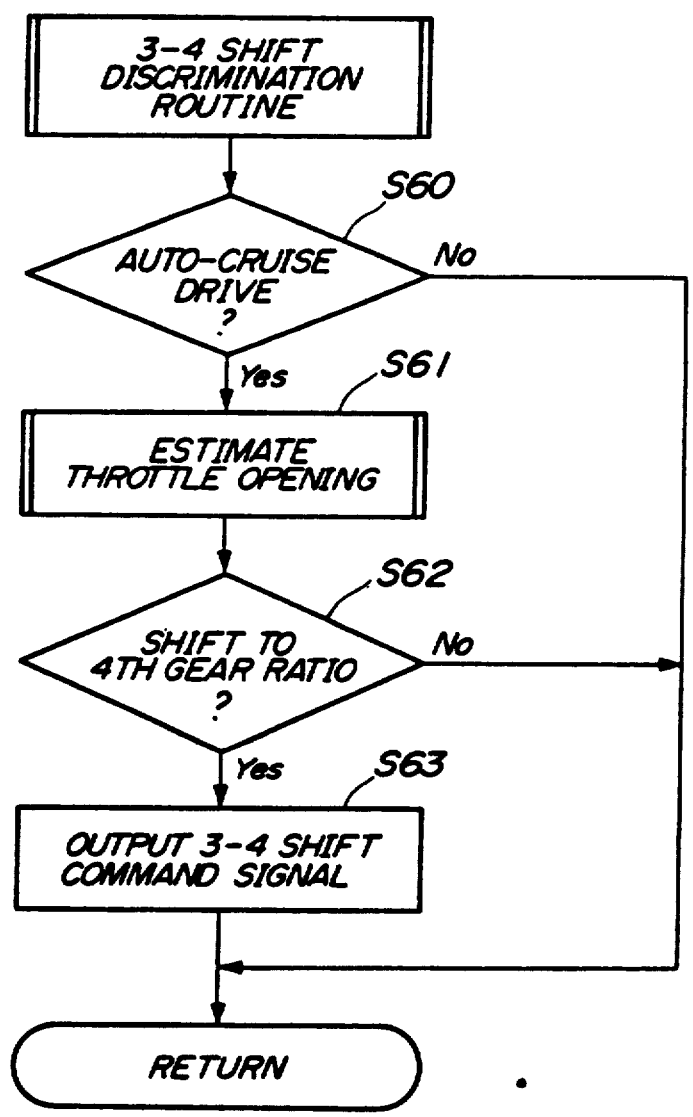
FIG. 31 is a flowchart of a process for determining a shifting of an automatic transmission from the third gear ratio to the fourth gear ratio.

In the flowchart of FIG. 31, first, it is determined whether the auto-cruise drive is under way, in Step S60. If No in Step S60, the electronic controller 3 ends the 3-4 shift discrimination routine, and if Yes in Step S60, the flow proceeds to Step S61 to carry out a throttle opening estimation routine. In this estimation routine, throttle opening $\theta 3$ necessary to maintain the target vehicle speed VO when the automatic transmission 11 is shifted from the third to the fourth gear ratio is estimated.

Figure 32:
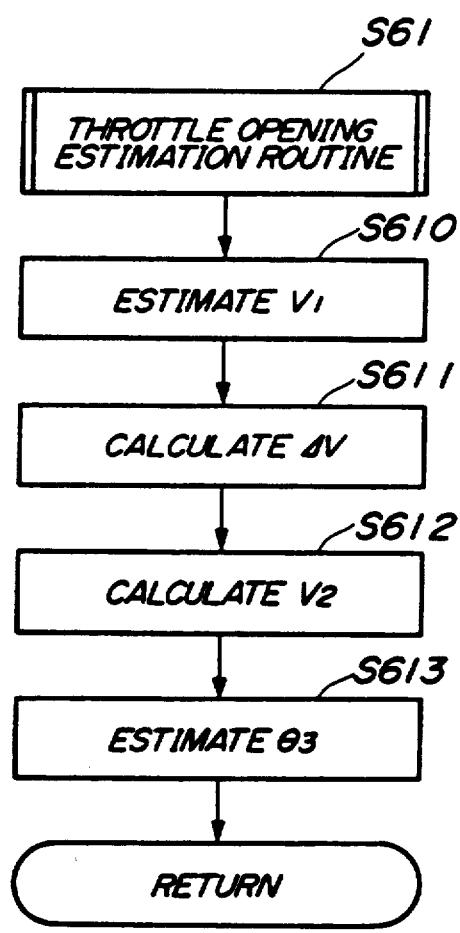
FIG. 32 is a flowchart showing part of the flowchart of FIG. 31 in detail.
Figure 33:
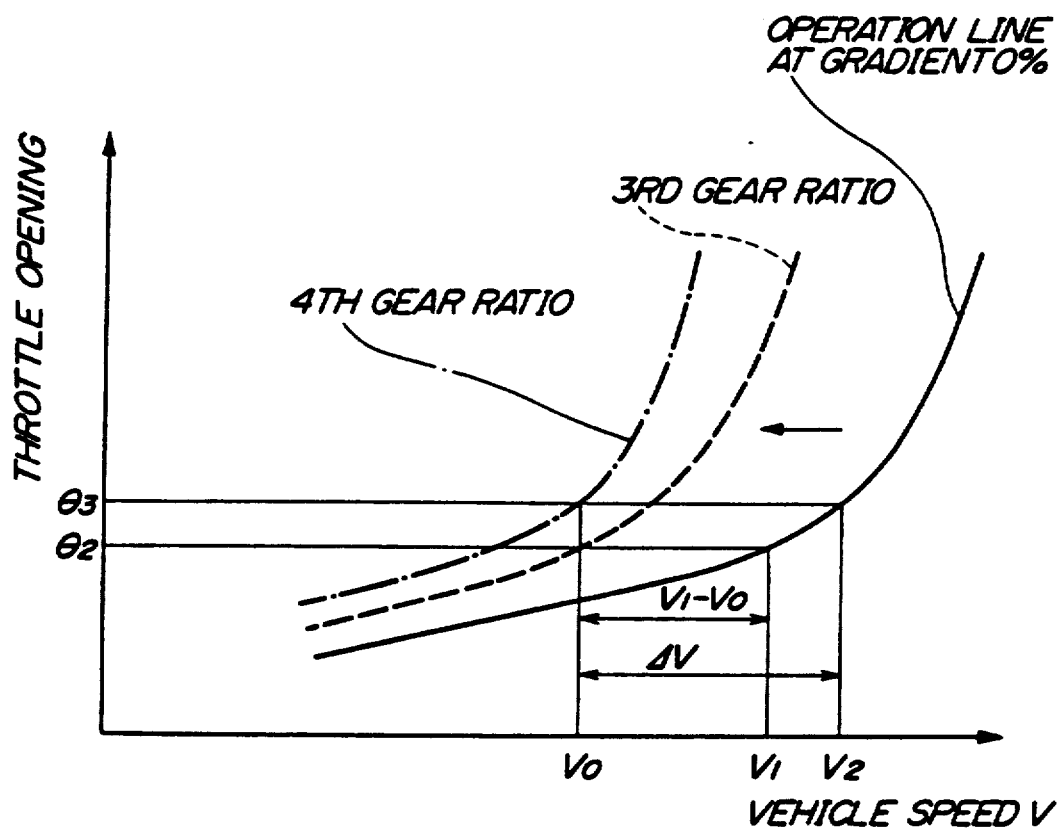
FIG. 33 is a graph showing an operation line obtained from the vehicle speed and the throttle opening, for the explanation of a manner of obtaining an estimated value of throttle opening.

FIG. 32 shows the details of the throttle opening estimation routine executed in Step S61. In Step S610 of the flowchart shown in FIG. 32, vehicle speed V1 which is maintainable provided that the current throttle opening $\theta 2$ is held and the vehicle runs on a flat surface of 0% gradient at the third gear ratio is estimated according to the operating line indicated by the full line in FIG. 33. In this case, for the current throttle opening $\theta 2$, either the actual throttle opening $\theta$th detected by the throttle valve opening sensor 14 or the target throttle opening $\theta$n mentioned with reference to the first embodiment may be used. The operating line indicated by the full line in FIG. 33 shows the relationship between the throttle opening and the vehicle speed under a normal operating condition of a vehicle, i.e., when the vehicle runs on an ordinary flat surface (gradient: 0%) with a predetermined load thereon. From this operating line the vehicle speed V1 with $\theta 2$ maintained can be estimated.

When the vehicle runs on a flat surface, the operating line assumed when the third gear ratio is established in the automatic transmission 11 and the operating line assumed when the fourth gear ratio is established in the transmission 11 are approximately similar to that indicated by the full line in FIG. 33. Accordingly, only one operating line (full line) is plotted in FIG. 33, as an example.

If the road on which the vehicle is running is inclined, a load corresponding to the gradient is applied on the vehicle, and accordingly, in such a case, the operating line is shifted in the direction of the arrow from the operating line indicated by the full line. As indicated by the broken line in FIG. 33, for example, it is possible to estimate the operating line assumed when the vehicle runs on an inclined surface at the third gear ratio, based on the current throttle opening $\theta 2$ and the vehicle speed V (it is assumed that the vehicle is running approximately at the target vehicle speed VO). In this case, the vehicle speed deviation (V1−VO) between the vehicle speed V1 and the target vehicle speed VO can be regarded as the load corresponding to the gradient of the road.

Next, in Step S611, since the above vehicle speed deviation (V1−VO) is obtained on the assumption that the third gear ratio is established, the vehicle speed deviation (V1−VO) is converted into deviation $\Delta V$ corresponding to the load of the gradient at the time the vehicle runs at the fourth gear ratio, by using the following equation (6):

$$\Delta V = (V1 - VO)/R4 \quad (6)$$

where R4 is the fourth gear reduction ratio (e.g., 0.70).

Subsequently, in Step S612, vehicle speed V2 which is maintainable when the vehicle runs on a surface of 0% gradient with the current throttle opening $\theta 2$ maintained is calculated from the following equation (7):

$$V2 = VO + \Delta V \quad (7)$$

In Step S613, throttle opening $\theta 3$ necessary to maintain the vehicle speed V2 on a surface of 0% gradient is estimated from the vehicle speed V2 calculated by equation (7) and the operating line indicated by the full line in FIG. 33, and the estimation routine is ended.

Then, the flow proceeds to Step S62 in FIG. 31, wherein it is determined whether the automatic transmission 11 should be shifted to the fourth gear ratio, based on the estimated throttle opening $\theta 3$.

Figure 34:
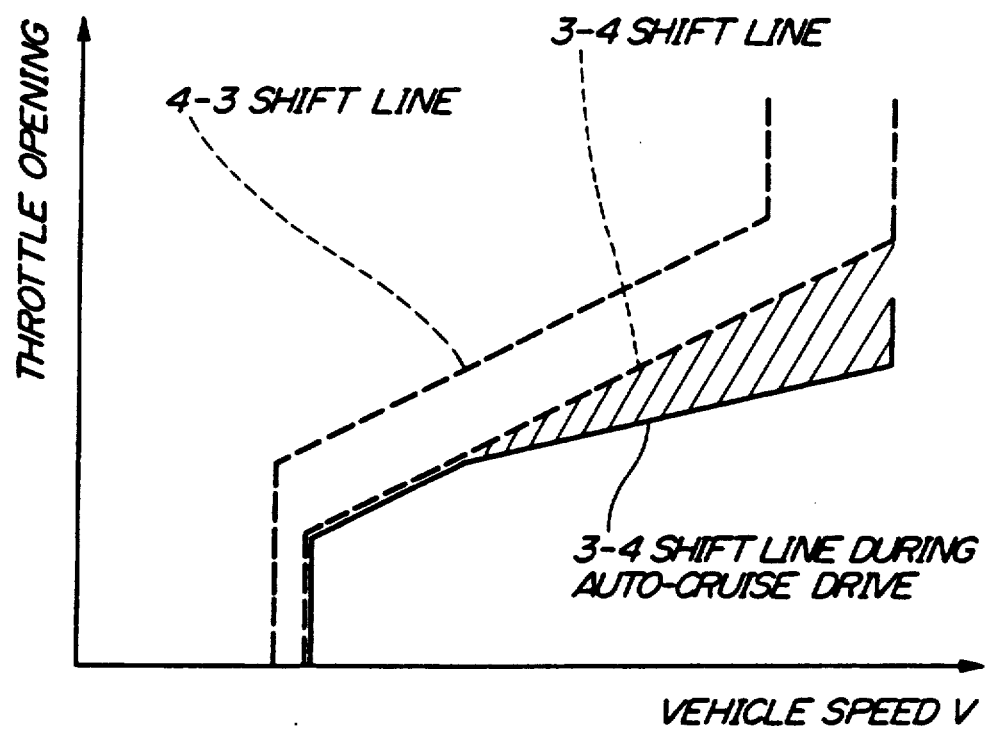
FIG. 34 is a 3-4 shift diagram showing a criterion based on vehicle speed V and target throttle opening θn for shifting the transmission gears of an automatic transmission from the third gear ratio to the fourth gear ratio.

FIG. 34 is a 3-4 shift diagram used for the determination in Step S62 and stored beforehand in a memory in the electronic controller 3. Also in the 3-4 shift diagram of FIG. 34, the operating region defining the gear ratio to be established is divided in accordance with the throttle opening and the vehicle speed.

Like the 4-3 shift diagram for the auto-cruise drive shown in FIG. 30, the 3-4 shift diagram is set taking account of a vehicle running on a surface of a predetermined gradient. Also in this case, the 3-4 shift diagram is applicable to a case in which the vehicle runs on a flat surface. The broken line in FIG. 34 indicates the 3-4 shift line of the automatic transmission 11 (which line is employed when the auto-cruise is not carried out in substance).

Therefore, in Step S62, the gear ratio to be established is determined based on the vehicle speed V detected by the vehicle speed sensor 4 and the estimated throttle opening $\theta 3$ obtained in the above-mentioned manner. If it is determined that the third gear ratio should be established, namely, if the decision in Step S62 is No, the discrimination routine is ended. On the other hand, if it is determined that the fourth gear should be established, namely, if the decision in Step S62 is Yes, a 3-4 shift command signal is output from the electronic controller 3 to the hydraulic control circuit 15 of the automatic transmission 11, whereby the automatic transmission 11 is shifted to the fourth gear ratio.

During the auto-cruise drive, even if it is determined from the 3-4 shift diagram of the automatic transmission 11, indicated by the broken line in FIG. 34, that the gear ratio should be shifted, the shift command signal based on the 3-4 shift diagram indicated by the full line in the same figure is given preference. Accordingly, when the vehicle is driven in the region hatched in FIG. 34, the automatic transmission 11 is maintained at the third gear ratio. Thus, as seen FIG. 34, the second shift diagram (3-4 shift line during auto-cruise drive (solid line in FIG. 34)) includes a region in which the throttle opening is smaller than that of the first shift diagram (3-4 shift line (broken line)) at the same vehicle speed. In FIG. 34, the 4-3 shift line of the automatic transmission 11 is also shown.

In the third embodiment, the shifting of the automatic transmission 11 in response to the shift command signal is carried out not based on the 3-4 shift diagram (broken line) of the automatic transmission 11, but based on the 3-4 shift diagram (solid line) suited to the auto-cruise drive, whereby the shifting can be quickly effected when the running condition of the vehicle is displaced to a region where the shifting is necessary. Thus, it is possible to prevent the automatic transmission 11 from being maintained at the third gear ratio for a long time, and the driving feeling is greatly improved.

Figure 35:
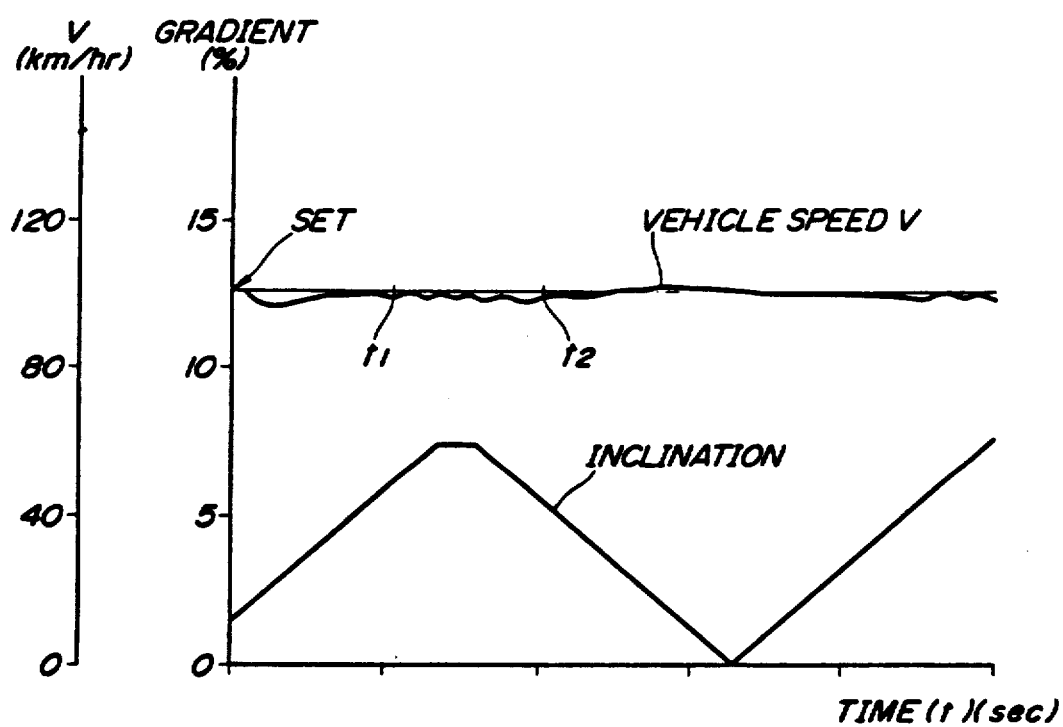
FIGS. 35 and 36 are graphs each showing the result of a vehicle speed control by a prior art apparatus when the vehicle is run on a long ascent with the target speed set at 100 km/hr.
Figure 36:
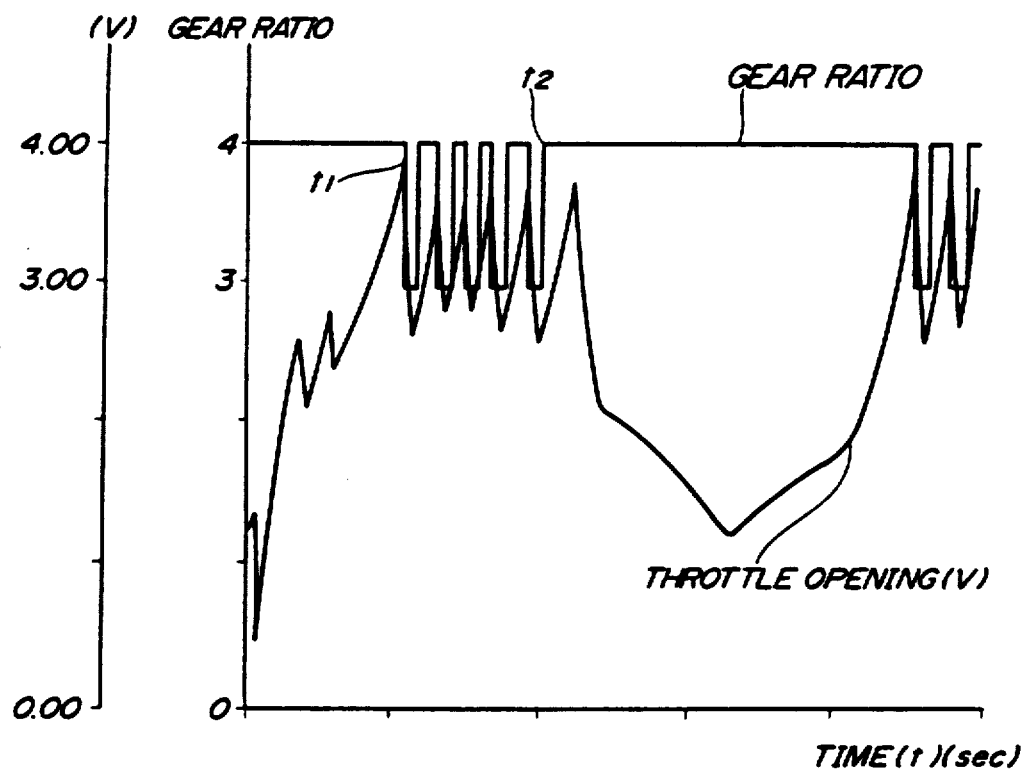
Figure 37:
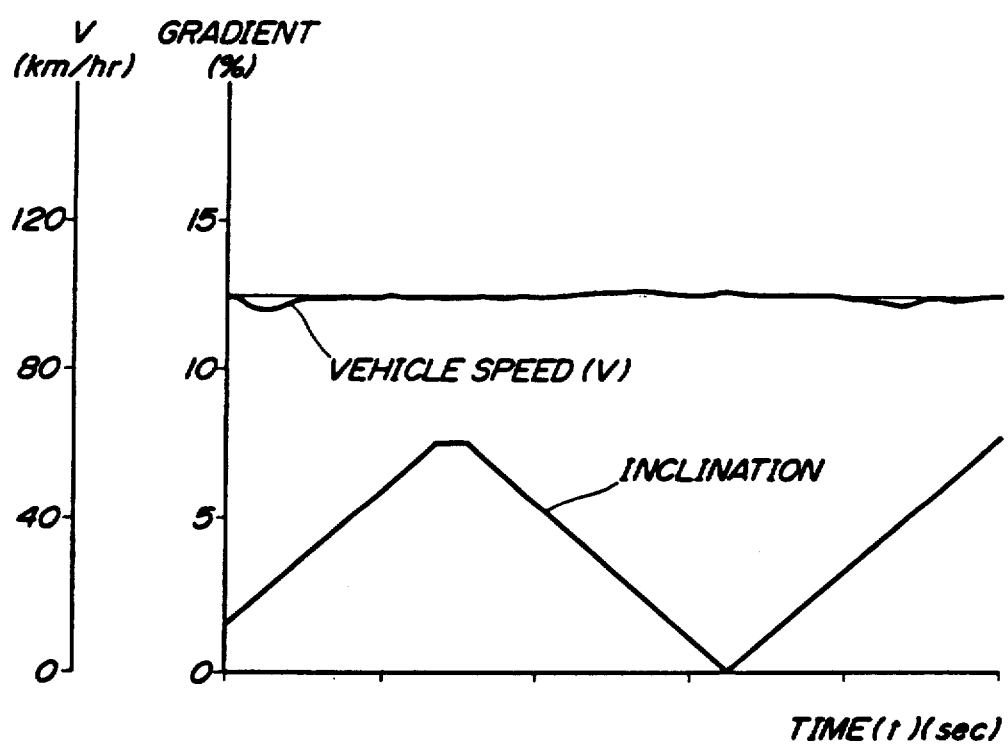
FIGS. 37 and 38 are graphs each showing the result of a vehicle speed control by the control device of the invention, obtained under the same conditions as in the case of FIGS. 35 and 36.
Figure 38:
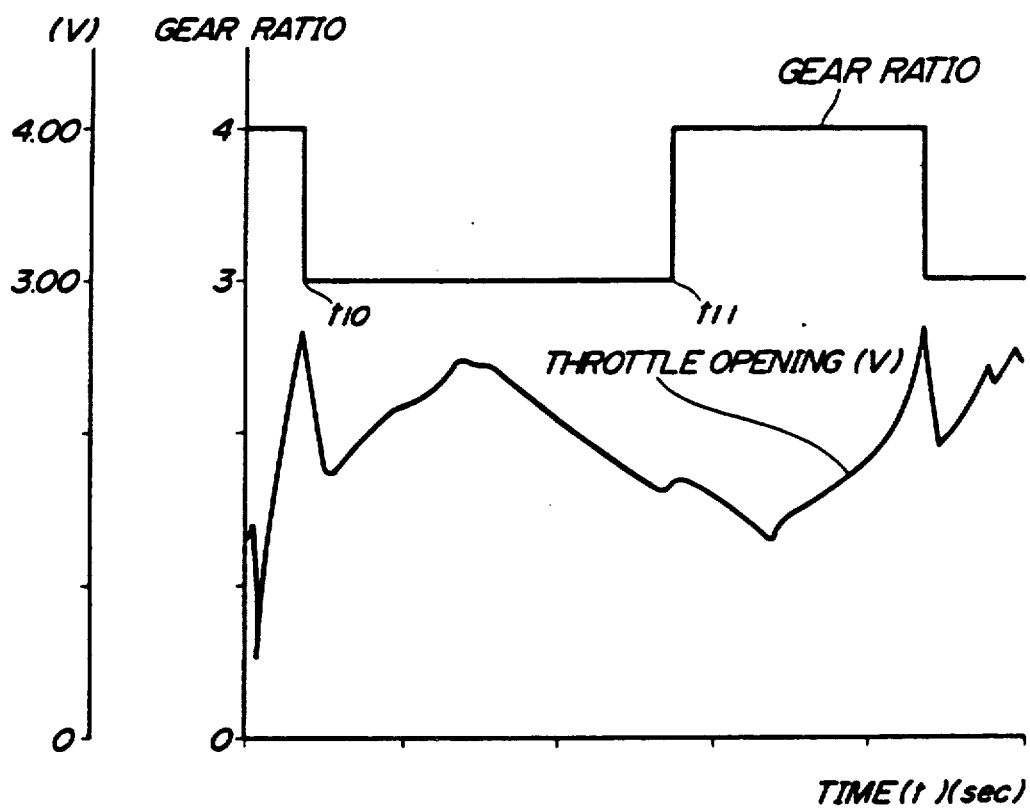

Now, the prior art device and the cruise control device according to the invention will be compared with each other as to the shift operation and the throttle opening θth observed when the vehicle ascends a long slope at the target vehicle speed 100 km/hr during the cruise control. FIGS. 35 and 36 show the case of the prior art device, and FIGS. 37 and 38 show the case of the cruise control device according to the invention.

According to the prior art device, as shown in FIG. 36, although the throttle opening θth increases, the third gear ratio is not readily established; it is attained with the throttle opening θth at the time t1. In this case, since the engine output is sufficient due to the shifting to the third gear ratio, the throttle opening θth is reduced, causing an immediate shifting to the fourth gear ratio which results in an increase in the throttle opening θth. Thus, the shifting between the third and fourth gear ratios is repeated in a short period from the time t1 to the time t2, and accordingly, during this period, the vehicle speed V fluctuates as shown in FIG. 35, damaging the driving feeling.

According to the cruise control device of the present invention, a shift-down to the third gear ratio is carried out (time t10 in FIG. 38) before the throttle opening θth is largely increased, unlike in the prior art device, and a shift-up to the fourth gear ratio is carried out (time t11 in FIG. 38) after the throttle opening θth is sufficiently reduced, in accordance with the shift lines for the auto-cruise drive shown in FIGS. 30 and 34. During the time between these shift operations, the vehicle speed V is maintained substantially at the target vehicle speed VO, as shown in FIG. 37, and therefore, frequent opening/closing of the throttle valve 6 and unnecessary shifting within a short period can be avoided, thereby enabling a smooth and natural shifting and ensuring a satisfactory driving feeling.

What is claimed is:

1. A cruise control device for maintaining the speed of a motor vehicle close to a target vehicle speed by controlling the opening of a throttle valve for adjusting the output of an engine provided in the vehicle, said cruise control device including an automatic transmission of which a shifting of gear ratios is carried out based on a first shift diagram defined in accordance with the opening of the throttle valve and the vehicle speed, said cruise control device comprising:

control means comprising said first shift diagram and a second shift diagram applied during a cruise control and defining a gear ratio to be established in the automatic transmission in accordance with the opening of the throttle valve and the vehicle speed, said second shift diagram including a region in which the opening of the throttle valve is smaller than that of the first shift diagram at the same vehicle speed;

means for setting the target vehicle speed;

means for obtaining a target opening of the throttle valve so as to bring the vehicle speed to the target vehicle speed;

a vehicle speed sensor for detecting the speed of the vehicle at least during cruise control; and means for carrying out a shifting of the gear ratios of the automatic transmission in accordance with the target opening of the throttle valve and the value of the vehicle speed detected by said vehicle speed sensor, based on said second shift diagram during cruise control.

2. The cruise control device according to claim 1, wherein said automatic transmission has a third gear ratio and a fourth gear ratio, and said second shift diagram defines a down-shift diagram which is used when the shifting of gear ratios of the automatic transmission is carried out from the fourth gear ratio to the third gear ratio.

3. A cruise control device for maintaining the speed of a motor vehicle close to a target vehicle speed by controlling the opening of a throttle valve for adjusting the output of an engine provided in the vehicle, said cruise control device including an automatic transmission of which a shifting of gear ratios is carried out based on a first shift diagram defined in accordance with the opening of the throttle valve and the vehicle speed, said cruise control device further comprising:

control means comprising said first shift diagram and a second shift diagram applied during a cruise control and defining a gear ratio to be established in the automatic transmission in accordance with the opening of the throttle valve and the vehicle speed;

means for setting the target vehicle speed;

means for obtaining a target opening of the throttle valve so as to bring the vehicle speed to the target vehicle speed;

a vehicle speed sensor for detecting the speed of the vehicle at least during cruise control; and means for carrying out a shifting of the gear ratios of the automatic transmission in accordance with the target opening of the throttle valve and the value of the vehicle speed detected by said vehicle speed sensor, based on said second shift diagram during cruise control;

said automatic transmission having a third gear ratio and a fourth gear ratio, and when said second shift diagram defines an up-shift diagram which is used when the shifting of gear ratios of the transmission is carried out from the third gear ratio to the fourth gear ratio, and said means for obtaining the target opening of the throttle valve includes means for obtaining a calculated opening of the throttle valve as the target opening, which is required to maintain the target vehicle speed when the shifting of gear ratios of the automatic transmission is carried out from the third gear ratio to the fourth gear ratio.

* * * * *